(12) United States Patent
Choi et al.

(10) Patent No.: US 12,384,625 B2
(45) Date of Patent: Aug. 12, 2025

(54) METHOD FOR PROCESSING ORDER

(71) Applicant: Twinny Co., Ltd., Daejeon (KR)

(72) Inventors: Eun Sol Choi, Daejeon (KR); Seol Hee Jeon, Daejeon (KR); Seung Wan Han, Daejeon (KR)

(73) Assignee: Twinny Co., Ltd., Daejeon (KR)

( * ) Notice: Subject to any disclaimer, the term of this patent is extended or adjusted under 35 U.S.C. 154(b) by 0 days.

(21) Appl. No.: 19/004,030

(22) Filed: Dec. 27, 2024

(65) Prior Publication Data

US 2025/0214775 A1    Jul. 3, 2025

Related U.S. Application Data

(63) Continuation of application No. PCT/KR2024/021028, filed on Dec. 24, 2024.

(30) Foreign Application Priority Data

Dec. 29, 2023    (KR) .................. 10-2023-0196991

(51) Int. Cl.
*G06F 7/00* (2006.01)
*B65G 1/04* (2006.01)
(Continued)

(52) U.S. Cl.
CPC ......... *B65G 1/1373* (2013.01); *B65G 1/0492* (2013.01); *G06Q 10/087* (2013.01); *G06Q 30/0635* (2013.01)

(58) Field of Classification Search
CPC ...... B65G 1/1373; B65G 1/0492; B65G 1/00; B65G 67/00; B65G 2203/00;
(Continued)

(56) References Cited

U.S. PATENT DOCUMENTS 9,242,799 B1 * 1/2016 O'Brien ................. G05B 15/02
9,751,693 B1 * 9/2017 Battles ................... B25J 9/0084
(Continued)

FOREIGN PATENT DOCUMENTS

KR         10-2263887 B1     6/2021
KR    10-2021-0130155 A     10/2021
(Continued)

OTHER PUBLICATIONS

Office Action received in Korean Application No. 10-2023-0196991 dated May 8, 2024.

*Primary Examiner* — Yolanda R Cumbess
(74) *Attorney, Agent, or Firm* — Knobbe, Martens, Olson & Bear, LLP

(57) ABSTRACT

An order processing method includes receiving a plurality of orders from a warehouse management server; identifying characteristic information of a first item which is an item included in a first order, among the plurality of orders; selecting a first tote which is a tote accommodating the first item, using characteristic information of the first item; and determining a first tote position where the first tote is to be disposed on a transport robot, based on both occupation area information and accommodable area information of the transport robot, stored in the memory in advance. A first occupation area is an area occupying the transport robot when the first tote is disposed on the transport robot.

16 Claims, 18 Drawing Sheets

(51) Int. Cl.
*B65G 1/137* (2006.01)
*G06Q 10/087* (2023.01)
*G06Q 30/0601* (2023.01)

(58) Field of Classification Search
CPC ............. B65G 2209/00; G06Q 10/087; G06Q 30/0635; G06Q 10/047; G06Q 10/06; G06Q 10/08; G06Q 30/06
USPC .......................... 700/213–216, 223, 224, 228
See application file for complete search history.

(56) References Cited

U.S. PATENT DOCUMENTS 10,001,768 B2 * 6/2018 Johnson ................ G05B 19/124
2019/0302787 A1 * 10/2019 Li .................... G06Q 10/06316

FOREIGN PATENT DOCUMENTS

| KR | 10-2022-0139987 A | 10/2022 |
| KR | 10-2023-0062936 A | 5/2023 |
| KR | 10-2023-0137657 A | 10/2023 |

* cited by examiner

| ORDER | ITEM TYPE AND QUANTITY | | TOTE |
|---|---|---|---|
| ORDER 1 | TWO ITEMS A | ONE ITEM B | SELECT FIRST TOTE<br>–TOTE a (ACCOMMODATE TWO ITEMS A)<br>–TOTE b (ACCOMMODATE ONE ITEM B) |
| ORDER 2 | ONE ITEM C | FOUR ITEMS D<br>TWO ITEMS E | SELECT SECOND TOTE<br>–TOTE c (ACCOMMODATE ONE ITEM C AND TWO ITEMS E)<br>–TOTE d (ACCOMMODATE FOUR ITEMS D) |
| ORDER 3 | ONE ITEM F | – | SELECT THIRD TOTE<br>–TOTE e (ACCOMMODATE ONE ITEM F) |

FIG. 3

| ORDER | ITEM TYPE AND QUANTITY | | | TOTE |
|---|---|---|---|---|
| ORDER 1 | TEN ITEMS A | TWO ITEM B | ONE ITEM C (BREAKAGE RISK INFORMATION: 90%) | SELECT FIRST TOTE<br>- TOTE a (ACCOMMODATE FIVE ITEMS A)<br>- TOTE b (ACCOMMODATE FIVE ITEM A)<br>- TOTE c (ACCOMMODATE TWO ITEMS B)<br>- TOTE d (ACCOMMODATE ONE ITEM C) |
| ORDER 2 | ONE ITEM D | FOUR ITEMS E | TWO ITEMS F | SELECT SECOND TOTE<br>- TOTE e (ACCOMMODATE ONE ITEM D AND TWO ITEMS F)<br>- TOTE f (ACCOMMODATE FOUR ITEMS E) |
| ORDER 3 | ONE ITEM G | - | - | SELECT THIRD TOTE<br>- TOTE g (ACCOMMODATE ONE ITEM G) |

FIG. 11

METHOD FOR PROCESSING ORDER

CROSS-REFERENCE TO RELATED APPLICATION

This application is a continuation application of PCT Application No. PCT/KR2024/021028 filed Dec. 24, 2024 and claims priority to and the benefit of Korean Patent Application No. 10-2023-0196991, filed on Dec. 29, 2023, the disclosures of which are incorporated herein by reference in their entirety.

BACKGROUND

The present disclosure relates to a method for processing an order received from a warehouse management server.

An online item delivery service is configured by a process of inputting an order online using an orderer's terminal by an orderer, a process of picking an item included in the order from the logistics warehouse and conveying the item to a packing table by a picking worker, a processor of packing the conveyed item on the packing table by a packing worker, and a process of delivering the packed item to the orderer by a delivering worker.

However, in the item delivery service configured as described above, since the number of orders and the number of items included in the order are very large, the process of picking an item included in the order from a logistics warehouse and conveying the item to a packing table by a picking worker requires too much time and efforts for the picking worker to perform the process entirely manually. Accordingly, in recent years, the trend is to process the orderer's order more quickly and conveniently by causing a transport robot to at least partially perform the tasks performed by the picking worker.

In the meantime, U.S. Pat. No. 10,994,933 discloses a method for recommending a tote to an operator by evaluating one or more positions of a plurality of robots, a plurality of operators, or a plurality of active positions in a warehouse and identifying one or more groups of a plurality of robots, a plurality of operators, and/or a plurality of active positions which are proximate to each other in the warehouse.

SUMMARY

A process of picking items included in the orderer's order from the logistics warehouse is referred to as order picking. The transport robot autonomously travels in the logistics warehouse to process the orderer's order and at this time, the worker picks the item included in the orderer's order and loads the item on the transport robot while moving together with the transport robot. In order to stably load the item on the transport robot, the worker needs to place a transport box, called a tote, on the transport robot first.

However, even though the worker identifies an item included in the order, it may be difficult to know what type of tote makes sense to place on a transport robot. It is also considerable to unconditionally place a large tote on the transport robot. However, when the large tote is disposed on the transport robot despite the small size and a small number of items included in the order, the number of items to be transported by one transport robot is small so that the item transport efficiency and the order processing efficiency may be very low. However, if a worker checks the item included in the order and selects a tote suitable for accommodating the item for every order, the tote selecting task and the order processing task may be delayed.

An aspect of the present disclosure provides a method for improving a task efficiency of a worker who loads a tote on a transport robot.

Further, an aspect of the present disclosure provides a method for improving an efficiency of processing an order through a transport robot.

However, a technical object to be achieved by the present disclosure is not limited only to the above-described object and other technical objects which have not been mentioned may be more clearly understood by those skilled in the art from the description of the present disclosure described below.

The present disclosure provides an order processing method performed by a processor which executes at least one instruction stored in a memory, including: receiving a plurality of orders from a warehouse management server; identifying characteristic information of a first item which is an item included in a first order, among the plurality of orders; selecting a first tote which is a tote accommodating the first item, using characteristic information of the first item; and determining a first tote position where the first tote is to be disposed on a transport robot, based on both occupation area information and accommodable area information of the transport robot, stored in the memory in advance; wherein the first occupation area is an area occupying the transport robot when the first tote is disposed on the transport robot.

The order processing method according to the present disclosure may further include: identifying characteristic information of a second item which is an item included in a second order, among the plurality of orders; selecting a second tote which is a tote accommodating the second item, using characteristic information of the second item; comparing a currently accommodable area of the transport robot and the second occupation area of the second tote; and determining a second tote position where the second tote is to be disposed on a transport robot.

The order processing method according to the present disclosure may further include: selecting a third tote corresponds to a third order, among the plurality of orders; and determining a third tote position where the third tote is to be disposed on a transport robot, based on both occupation area information and information of accommodable area excluding the first occupation area of the transport robot, stored in the memory in advance; wherein the third tote position determined prior to the second tote position.

The processor may display the first tote position and the second tote position on a screen of the transport robot, respectively.

The processor may display the first tote position on the screen of the transport robot with a first marker and the second tote position on the screen of the transport robot with a second marker, wherein the second marker is different from the first marker.

The processor may display a virtual shape of the first tote disposed in the first tote position and a virtual shape of the second tote disposed in the second tote position on the screen of the transport robot, respectively.

The processor may differently display the virtual shape of the first tote and the virtual shape of the second tote.

The processor may the first tote having a strength corresponding to weight information of the first item, using the weight information of the first item among the characteristic information of the first item, wherein the corresponding relation based on a lookup table in which weight information of items and strength information of totes are recorded to be associated with each other.

The processor may select the first tote having an anti-breakage efficiency corresponding to breakage risk information of the first item, using the breakage risk information of the first item among the characteristic information of the first item, wherein the corresponding relation based on a lookup table in which breakage risk information of items and anti-breakage efficiency information of totes are recorded to be associated with each other.

Further, the present disclosure relates to an order processing method performed by a processor which executes at least one instruction stored in a memory, including: receiving a plurality of orders from a warehouse management server; identifying characteristic information of a first item which is a plurality of items included in a first order, among the plurality of orders; selecting a first tote which is a plurality of totes accommodating the first item, using the characteristic information of the first item; selecting at least one transport robot to which the first tote is to be transported, based on both occupation area information and accommodable area information of the transport robot, stored in the memory in advance; and determining a first tote position where the first tote is to be disposed on the at least one transport robot; wherein the first occupation area is an area occupying the at least one transport robot when the first tote is disposed on at least one transport robot.

The selecting at least one transport robot including: selecting a first transport robot which is accommodable for a first partial tote, which is a partial tote of the first tote, based on the first occupation area; determining whether an area occupied by each tote excluding the first partial tote, among the first tote, exceeds a currently accommodable area of the first transport robot; and selecting a second transport robot which is accommodable for a second partial tote which is different from the first partial tote.

The order processing method according to the present disclosure may further include: determining whether an area occupied by each tote excluding the first partial tote and the second partial tote, among the first tote, exceeds a currently accommodable area of the second transport robot; and selecting a third transport robot which is accommodable for a third partial tote, which is a partial tote of the first tote which are different from the first partial tote and the second partial tote.

The processor may determine an aisle width between item storage racks in which items are placed in a warehouse, based on warehouse map information which is stored in the memory and item position information in the warehouse received from the warehouse management server, and may select the transport robot having a holder width corresponding to the aisle width through a lookup table in which the aisle width and the holder width of the transport robot are recorded to be associated with each other.

The processor may select a plurality of transport robots to which the first tote is to be transported, and may display the plurality of transport robots with the same marker.

The processor may select a plurality of transport robots to which the first tote is to be transported, and control the plurality of transport robots to dispose the plurality of transport robots adjacent to each other in a gathering point.

The processor may select a plurality of transport robots to which the first tote is to be transported and the order processing method according to the present disclosure may further include: identifying characteristic information of a second item which is an item included in a second order, among the plurality of orders; selecting a second tote which is a plurality of totes accommodating the second item, using the characteristic information of the second item; comparing a currently accommodable area of a transport robot among the plurality of transport robots and the second occupation area information of the second tote stored in the memory in advance; determining the second tote position where the second tote is to be disposed on the transport robot.

The order processing method according to the present disclosure may further include: selecting a third tote corresponds to a third order, among the plurality of orders; and determining a third tote position where the third tote is to be disposed on a transport robot among the plurality of transport robots, based on both occupation area information of the third tote and information of currently accommodable area of the transport robot; wherein the third tote position determined prior to the second tote position.

The processor may display the first tote position on a screen or on screens of the at least one transport robot.

According to the present disclosure, when a processor receives an order from a warehouse management server, the processor selects not only a tote which accommodates items included in the order, but also determines a position of the selected tote to be disposed on the transport robot. Accordingly, a worker who loads the tote in the transport robot may easily know which tote to place in which position of the transport robot, thereby significantly improving an operation efficiency of the worker who loads the tote in the transport robot.

Further, according to the present disclosure, it is configured to allow a transport robot to process as many orders as possible in consideration of a currently accommodable area of any one transport robot, thereby improving an efficiency of processing orders through the transport robot.

The effects of the present disclosure are not limited to the aforementioned effects, and other effects, which are not mentioned above, will be apparently understood to a person having ordinary skill in the art from the following description.

BRIEF DESCRIPTION OF DRAWINGS

The above and other aspects, features and other advantages of the present disclosure will be more clearly understood from the following detailed description taken in conjunction with the accompanying drawings, in which:

FIG. 3 is a view illustrating a plurality of orders received by a processor;

FIG. 11 is a view illustrating a plurality of orders received by a processor;

DETAILED DESCRIPTION OF THE EMBODIMENT

Hereinafter, an order processing method according to the present disclosure will be described in detail with reference to the accompanying drawings. The accompanying drawings are provided only as examples to sufficiently transmit the technical idea of the present disclosure to those skilled in the art, and the present disclosure is not limited to the drawings presented below and can be embodied in various other forms.

Figure 1:
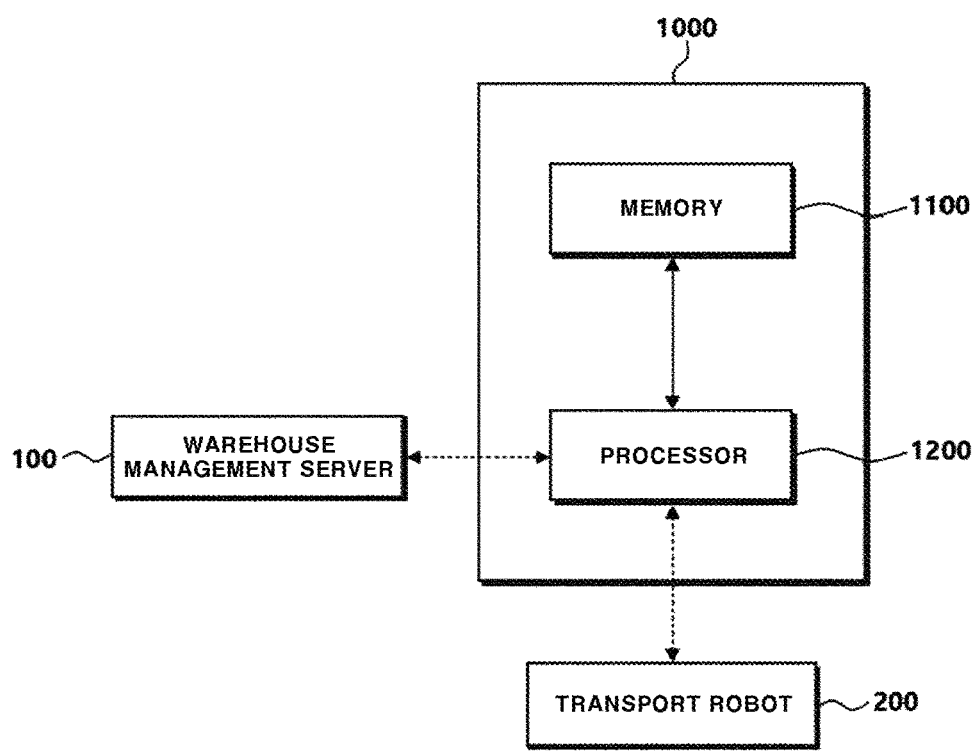
FIG. 1 is a view illustrating an order processing apparatus which performs an order processing method according to the present disclosure together with a warehouse management server and a transport robot.

FIG. 1 is a view illustrating an order processing apparatus 1000 which performs an order processing method according to the present disclosure together with a warehouse management server 100 and a transport robot 200.

The warehouse management server 100 may be a server which is operated by a manager of a logistics warehouse (hereinafter, referred to as a "warehouse"). The warehouse management server 100 may store position information of an inventory provided in the warehouse and an order input by an orderer online. Further, the warehouse management server 100 may transmit position information of the inventory provided in the warehouse and the input order to the order processing apparatus 1000 by means of the communication with the order processing apparatus 1000.

The order processing apparatus 1000 may be a server which is operated by a manager of the transport robot 200 and may include a memory 1100 and a processor 1200.

At least one instruction is stored in the memory 1100 and various information required for the processor 1200 to process the order is stored. In order to perform such a storing function, the memory 1100 may include a volatile or a non-volatile storage medium. For example, the memory 1100 may be implemented by read only memory (ROM), random access memory (RAM), erasable programmable read only memory (EPROM), electrically erasable programmable read only memory (EEPROM), flash memory, static RAM (SRAM), hard disk drive (HDD), solid state drive (SSD), or the like or implemented by including them. The processor 1200 executes at least one instruction stored in the memory 1100 to process the order. The instruction executed by the processor 1200 is a computer executable instruction. The processor 1200 may be implemented by a micro processing unit (MPU), a central processing unit (CPU), a graphics processing unit (GPU), a tensor processing unit (TPU), or the like or implemented by including them to execute the instruction. The processor 1200 may be electrically or communicably connected to the memory 1100. Further, the processor 1200 may be communicably connected to the warehouse management server 100 and the transport robot 200, respectively.

A worker places a tote on the transport robot 200 and an item included in the order is accommodated in the tote. The transport robot 200 may travel in accordance with the control of the processor 1200 and a tote position or a virtual shape of the tote may be displayed on a screen 202 as it will be described below.

Figure 2:
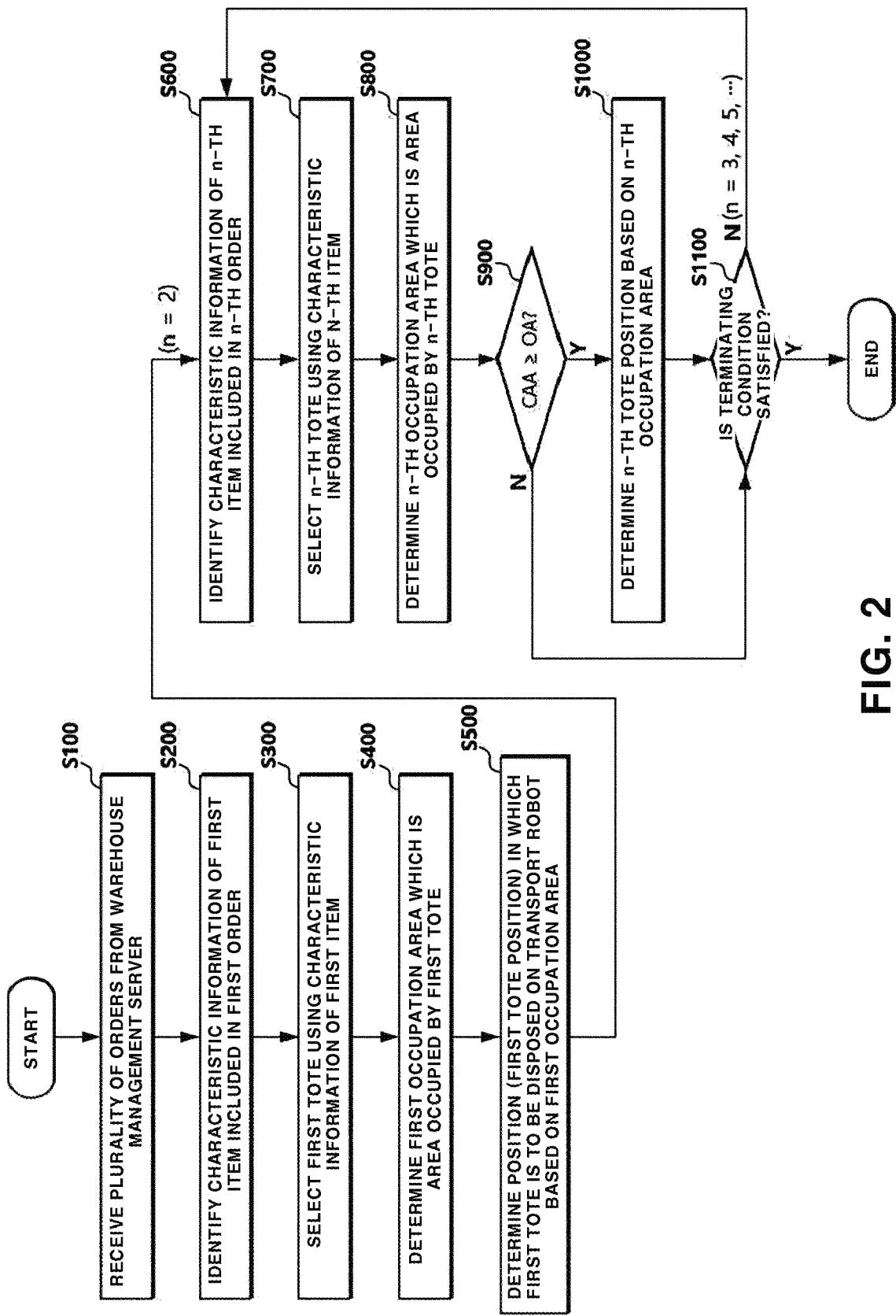
FIG. 2 is a flowchart of an order processing method according to a first embodiment of the present disclosure.

FIG. 2 is a flowchart of an order processing method according to a first embodiment of the present disclosure. The processor 1200 executes at least one instruction stored in the memory 1100 to perform the order processing method in the order as illustrated in FIG. 2.

Referring to FIG. 2, the processor 1200 may first receive a plurality of orders from a warehouse management server 100 in step S100. Here, the plurality of orders may be orders which are made by different orderers or orders which are made by the same orderer at different timings.

FIG. 3 is a view illustrating a plurality of orders received by a processor 1200. As illustrated in FIG. 3, the processor 1200 may receive order 1, order 2, order 3, and the like from the warehouse management server 100 and each order may include at least one item. For example, order 1 may include two items A and one item B, order 2 may include one item C, four items D, and two items E, and order 3 may include one item F.

After the step S100, the processor 1200 may identify characteristic information of a first item which is at least one item included in the first order, among a plurality of orders in step S200.

Referring to an example of FIG. 3, the processor 1200 may specify order 1 which is any one order among a plurality of orders as a first order and specify two items A and one item B included in the first order as a first item. For example, the processor 1200 may specify a first order, a second order, and the like in the order of orders received from the warehouse management server 100.

Further, the processor 1200 may identify the characteristic information of the first item (that is, two items A and one item B). In the present disclosure, the characteristic information of the item may be type information, size information, quantity information, weight information, breakage risk information, and the like of the item.

Among the characteristic information of the item, the type information and the quantity information may be received from the warehouse management server 100 by the processor 1200. Among the characteristic information of the item, the size information, the weight information, and breakage risk information may be received from the warehouse management server 100 by the processor 1200 or may be stored in advance in the memory 1100 to be loaded by the processor 1200. However, the identification of the characteristic information is just illustrative so that the processor 1200 may identify the characteristic information of the first item by various methods.

In the present disclosure, the item type information refers to information about a type of the item, such as item A and item B. The item quantity information may refer to information on the number of specific items, such as two items A and one item B. Item size information refers to information about a 3D area occupied by the item. The item weight information refers to information about a weight of the item. The breakage risk information of the item refers to information obtained by representing breakage risk of the item with numerical values (for example, the breakage risk is 30%, 50%, 80%, etc.), a degree (for example, a breakage risk is low, medium, and high), or the like.

After the step S200, the processor 1200 may select a first tote which is at least one tote accommodating the first item, using at least one of the type information, size information, and quantity information of the first item, among characteristic information of the first item in step S300.

In the present disclosure, the tote refers to means (a box, a shelf, a basket, a stand, a container, a vessel, or the like) of accommodating items.

The processor 1200 may determine that it is desirable to accommodate two items A and one item B in one tote by using at least one of type information, size information, and quantity information of the first item. In this case, the processor 1200 may select one tote for accommodating two items A and one item B as a first tote.

In contrast, the processor 1200 may determine that it is desirable to accommodate two items A and one item B in separate totes by using at least one of type information, size information, and quantity information of the first item. In this case, the processor 1200 may select one tote (for example, tote a of FIG. 3) for accommodating two items A and one tote (for example, tote b of FIG. 3) for accommodating one item B as a first tote. In the present disclosure, tote a, tote b, tote c, and the like may refer to identification information of the totes. Accordingly, the worker may identify a tote to be disposed in the transport robot 200 by means of the tote identification information of tote a, tote b, tote c, and the like selected by the processor 1200.

In the memory 1100, a criterion for allowing the processor 1200 to select a tote by utilizing type information, size information, and quantity information of the item and weight information and breakage risk information may be stored in advance. Accordingly, the processor 1200 loads the tote selection criterion which is stored in advance in the memory 1100 to select a tote.

Alternatively, the processor 1200 may select a tote by utilizing an artificial intelligence algorithm. That is, the processor 1200 may load a previously trained artificial intelligence algorithm from the memory 1100 and then input at least one of type information, size information, and quantity information of the first item in the artificial intelligence algorithm. At this time, the artificial intelligence algorithm may output a tote selection result value and the processor 1200 may select at least one tote (that is, a first tote) which accommodates the first item through the tote selection result value.

Hereinafter, it is assumed that the processor 1200 selects the tote a and the tote b as a first tote for accommodating a first item.

After the step S300, the processor 1200 may determine a first occupation area which is occupied by the first tote in step S400.

When the processor 1200 selects the tote a and the tote b as the first tote, an area OAa occupied by the tote a and an area OAb occupied by the tote b may be determined. Here, the area OAa occupied by the tote a and the area OAb occupied by the tote b become the first occupation area.

As an example of determining the occupation area, in the memory 1100, occupation area information for each tote which is selected by the processor 1200 may be stored in the memory 1100 in advance. Accordingly, when the processor 1200 performs the step S400, the processor 1200 loads the occupation area information which is stored in the memory 1100 in advance to determine the first occupation areas (OAa and OAb).

After the step S400, the processor 1200 may determine a first tote position which is a position where the first tote is to be disposed on the transport robot 200, based on the first occupation area in step S500.

Figure 4:
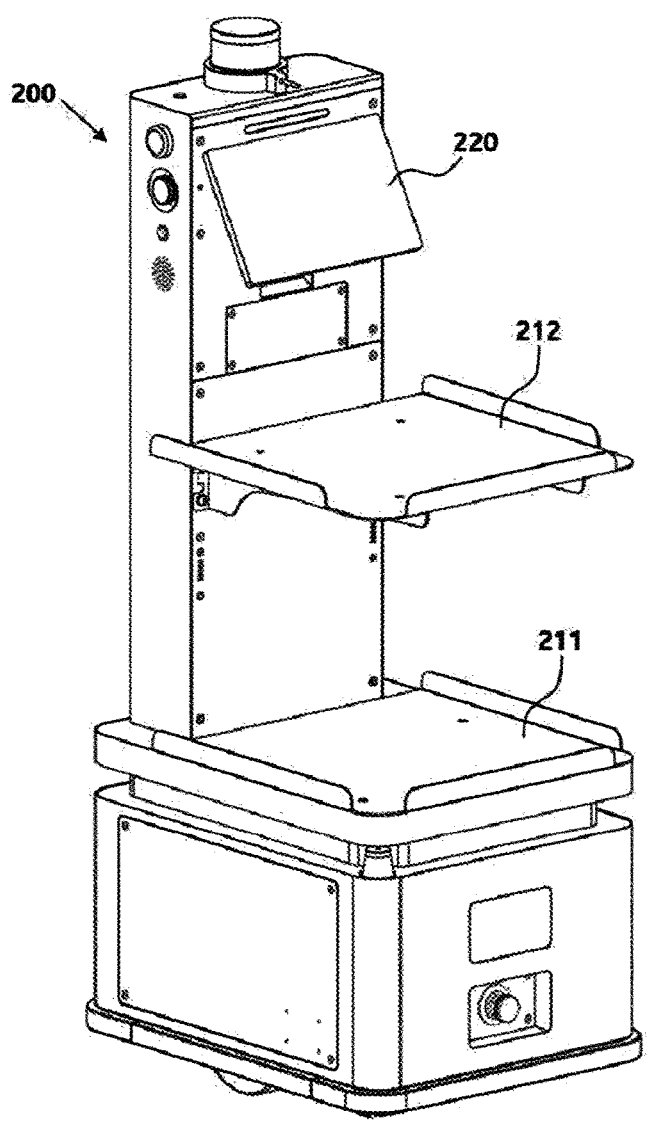
FIG. 4 is a view of a transport robot.

FIG. 4 is a view of a transport robot 200. The transport robot 200 illustrated in FIG. 4 may be equipped with holders 211 and 212 on which the tote 30 is disposed and a screen 220 on which a tote position, etc. is displayed.

In the memory 1100, accommodable area information of the transport robot 200 may be stored in advance. In FIG. 4, information about an accommodable area on a first holder 211 of the transport robot 200 and information about an accommodable area on a second holder 212 of the transport robot 200 may be stored in advance in the memory 1100. Accordingly, when the processor 1200 performs the step S500, the processor loads the accommodable area information which is stored in the memory 1100 in advance to determine the first tote position.

Figure 5:
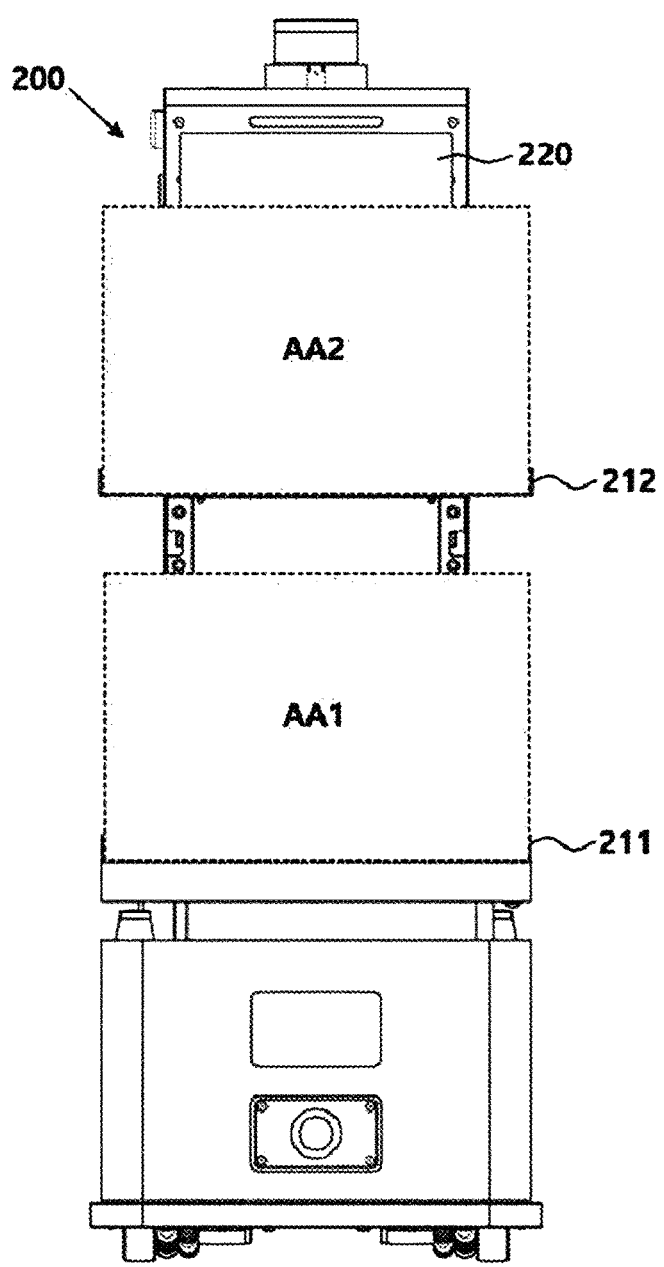
FIG. 5 is a view for explaining an accommodable area of a transport robot of FIG. 4.

FIG. 5 is a view for explaining an accommodable area of a transport robot 200 of FIG. 4. As illustrated in FIG. 5, the accommodable area on the first holder 211 may be AA1 and the accommodable area on the second holder 212 may be AA2.

Figure 6:
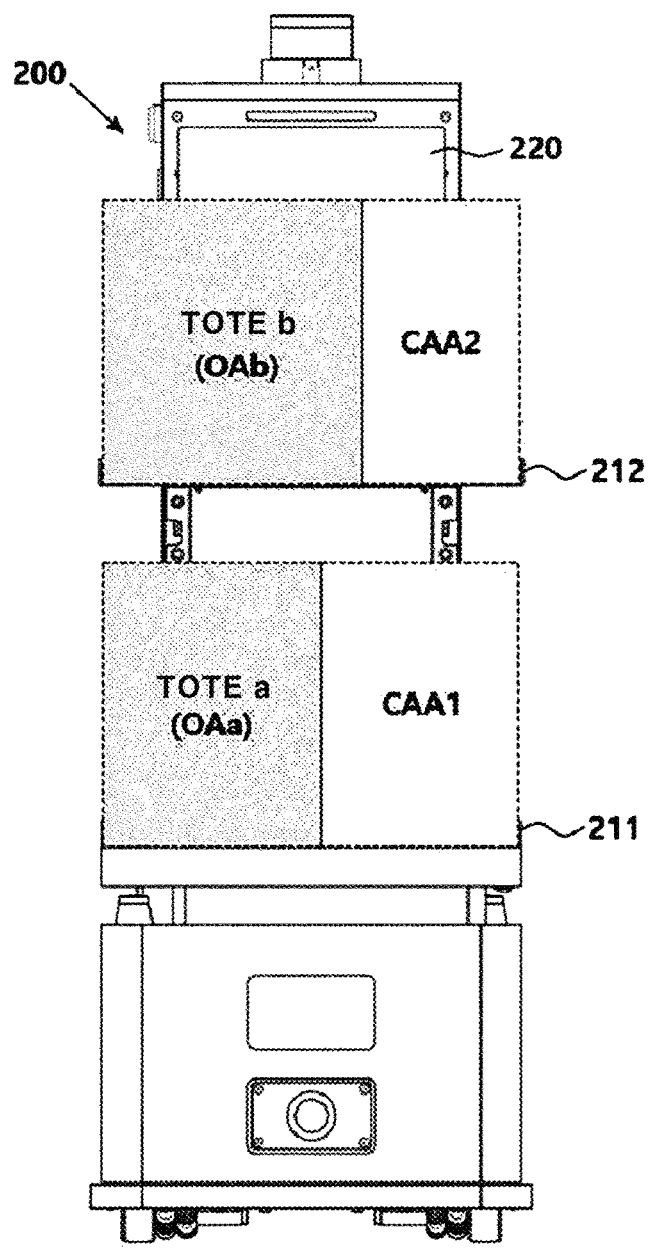
FIG. 6 illustrates that first totes (tote a and tote b) are disposed in the accommodable area of a transport robot of FIG. 5.

FIG. 6 illustrates that first totes (tote a and tote b) are disposed in the accommodable area of a transport robot 200 of FIG. 5.

The processor 1200 may compare the accommodable areas (AA1 and AA2) of the transport robot 200 and the first occupation areas (OAa and OAb) to determine the first tote position. As a comparison result, only when the first tote can be accommodated in the accommodable areas (AA1 and AA2) of the transport robot 200, the processor 1200 may determine the first tote position where the first tote is to be disposed on the transport robot.

To be more specific, the processor 1200 may determine whether the accommodable area AA1 on the first holder 211 is equal to or larger than an area OAa occupied by the tote a.

As a result determined by the processor 1200, when the accommodable area AA1 on the first holder 211 is equal to or larger than the area OAa occupied by the tote a, the processor 1200 may determine the position of the tote a to place the tote a on the first holder 211. At this time, as illustrated in FIG. 6, the processor 1200 may determine the position of the tote a so that the tote a is disposed at a point tilted to the left on the first holder 211.

Thereafter, under the condition that the tote a is disposed on the first holder 211, the processor 1200 may determine whether the currently accommodable area (that is, CAA1: an area obtained by subtracting OAa from AA1) on the first holder 211 is equal to or larger than the area OAb occupied by the tote b.

As a result determined by the processor 1200, when the currently accommodable area CAA1 on the first holder 211 is equal to or larger than the area OAb occupied by the tote b, the processor 1200 may determine the position of the tote b to place the tote b on the first holder 211.

In contrast, as a result determined by the processor 1200, when the currently accommodable area CAA1 on the first holder 211 is smaller than the area OAb occupied by the tote b, the processor 1200 may determine whether the accommodable area AA2 on the second holder 212 is equal to or larger than the area OAb occupied by the tote b by considering that the tote b cannot be disposed on the first holder 211.

As a result determined by the processor 1200, when the accommodable area AA2 on the second holder 212 is equal to or larger than the area OAb occupied by the tote b, the processor 1200 may determine the position of the tote b to place the tote b on the second holder 212. At this time, as illustrated in FIG. 6, the processor 1200 may determine the position of the tote b so that the tote b is disposed at a point tilted to the left on the second holder 212.

As described above, when the processor 1200 receives a plurality of orders from the warehouse management server 100, the processor 1200 selects the first totes (for example, tote a and tote b) to accommodate the first item (for example, two items A and one item B) included in a first order, among the plurality of orders.

Further, the processor 1200 determines a first position where the first totes are to be disposed on the transport robot 200 (in FIG. 6, see a position of tote a and a position of tote b), based on the selected area (for example, OAa and OAb) occupied by the first tote.

According to the present disclosure, a worker who places the tote on the transport robot 200 may easily know which tote to place in which position on the transport robot 200, thereby significantly improving an operation efficiency of the worker who places a tote in the transport robot 200.

In the meantime, the above-described steps S100 to S500 are steps for processing the first order using the transport robot 200 by the processor 1200. However, when the processor 1200 is configured to process only one order through one transport robot 200 all the time, the number of items transported by the transport robot 200 is limited to deteriorate the efficiency of processing the order. Accordingly, it is desirable for the processor 1200 to further perform the steps S600 to S1100, thereby allowing one transport robot 200 to process as many orders as possible.

As described above, in order to allow one transport robot 200 to process as many orders as possible, after the step S500, the processor 1200 may confirm characteristic information of an n-th item, which is at least one item included in an n-th order, among the plurality of orders in step S600.

Here, n is a natural number applied in an ascending order from 2, based on the number of times of performing the steps S600 to S1100. That is, when the number of times of performing the steps S600 to S1100 is one, n is 2, when the number of times of performing the steps S600 to S1100 is two, n is 3, and when the number of times of performing the steps S600 to S1100 is three, n is 4.

When it is assumed that the number of times of performing the steps S600 to S1100 is one, the processor 1200 may confirm the characteristic information of a second item which is at least one item included in a second order, among the plurality of orders.

Referring to an example of FIG. 3 again, the processor 1200 may specify an order 2 which is one of a plurality of orders as a second order and specify one item C, four items D, and two items E included in the second order as a second item.

Further, the processor 1200 may identify the characteristic information of the second item (that is, one item C, four items D, and two items E). Here, the characteristic information of the second item refers to type information, size information, quantity information, weight information, and breakage risk information of each of the item C, the item D, and the item E.

After the step S600, the processor 1200 may select an n-th tote which is at least one tote of accommodating the n-th item, using at least one of the type information, size information, and quantity information of the n-th item, among characteristic information of the n-th item in step S700.

In the above-described example, the processor 1200 may determine that it is desirable to accommodate one item C and two items E together in one tote using at least one of the type information, the size information, and the quantity information of the second item and to accommodate four items D in separate totes. In this case, the processor 1200 may select one tote (that is, tote c of FIG. 3) for accommodating one item C and two items E and one tote (that is, tote d of FIG. 3) for accommodating four items D as second totes. Here, the tote selecting method is the same as described above for the first tote.

After the step S700, the processor 1200 may determine an n-th occupation area which is occupied by the n-th tote in step S800.

As described above, in the memory 1100, occupation area information for each tote which is selected by the processor 1200 may be stored in advance. Accordingly, when the processor 1200 performs the step S800, the processor loads the occupation area information which is stored in the memory 1100 in advance to determine the n-th occupation area.

When the processor 1200 selects the tote c and the tote d as the second totes, an area OAc occupied by the tote c and an area OAd occupied by the tote d may be determined, respectively. Here, the area OAc occupied by the tote c and the area OAd occupied by the tote d become the second occupation area.

After the step S800, the processor 1200 may compare a currently accommodable area of the transport robot 200 and the n-th occupation area in step S900.

In the example of FIG. 6, the currently accommodable area of the transport robot 200 refers to a currently accommodable area CAA1 on the first holder 211 and a currently accommodable area CAA2 on the second holder 212.

Accordingly, the processor 1200 may compare the currently accommodable area CAA1 on the first holder 211 and an area OAc occupied by the tote c and compare the currently accommodable area CAA1 on the first holder 211 and an area OAd occupied by the tote d.

For example, the processor 1200 may determine whether the currently accommodable area CAA1 on the first holder 211 is equal to or larger than an area OAc occupied by the tote c. Further, the processor 1200 may determine whether the currently accommodable area CAA1 on the first holder 211 is equal to or larger than an area OAd occupied by the tote d.

Further, the processor 1200 may compare the currently accommodable area CAA2 on the second holder 212 and an area OAc occupied by the tote c and compare the currently accommodable area CAA2 on the second holder 212 and an area OAd occupied by the tote d.

For example, the processor 1200 may determine whether the currently accommodable area CAA2 on the second holder 212 is equal to or larger than an area OAc occupied by the tote c. Further, the processor 1200 may determine whether the currently accommodable area CAA2 on the second holder 212 is equal to or larger than an area OAd occupied by the tote d.

After the step S900, as a comparison result in the step S900, only when the n-th tote can be accommodated in the currently accommodable areas CAA1 and CAA2 of the transport robot 200, the processor 1200 may determine the n-th tote position where the n-th tote is to be disposed on the transport robot 200 in step S1000.

In the above example, when the processor 1200 determines that the currently accommodable area CAA1 on the first holder 211 is smaller than the area OAc occupied by the tote c and the currently accommodable area CAA2 on the second holder 212 is smaller than the area OAc occupied by the tote c, the processor 1200 may determine that it is not possible to accommodate the second tote in the currently accommodable areas (CAA1 and CAA2) of the transport robot 200 to perform step S1100.

Alternatively, when the processor 1200 determines that the currently accommodable area CAA1 on the first holder 211 is smaller than the area OAd occupied by the tote d and the currently accommodable area CAA2 on the second holder 212 is smaller than the area OAd occupied by the tote d, the processor 1200 may determine that it is not possible to accommodate the second tote in the currently accommodable areas CAA1 and CAA2 of the transport robot 200 to perform step S1100.

That is, when the processor 1200 determines that the currently accommodable areas CAA1 and CAA2 of the transport robot 200 cannot accommodate all the n-th totes (in the above example, tote c and tote d corresponding to the second totes), the processor 1200 may perform the step S1100. By doing this, items from the same order are prevented from being loaded on different transport robots to contribute to improving the operation efficiency of the worker.

After the step S1000, the processor 1200 may determine whether to satisfy a predetermined tote position determination terminating condition and repeat the steps S600 to S1100 until the predetermined tote position determination terminating condition is satisfied in step S1100.

Here, the tote position determination terminating condition may be set in the memory 1100 in advance so that the processor 1200 may load the tote position determination terminating condition set in the memory 1100 in advance to perform the step S1100.

The tote position determination terminating condition may be implemented in various examples, such as, when the currently accommodable area of the transport robot is smaller than an area set in the memory 1100 in advance, when the number of times of repeatedly performing the steps S600 to S1100 reaches the number of times of repeatedly performing the steps set in the memory 1100 in advance, when a time to perform the order processing method exceeds a time set in the memory 1100 in advance, or the like.

As a result determined by the processor 1200, when the order processing method according to the first embodiment of the present disclosure satisfies the predetermined tote position determination terminating condition, the processor 1200 may terminate a procedure for the order processing method.

In contrast, as a result determined by the processor 1200, when the order processing method according to the first embodiment of the present disclosure does not satisfy the predetermined tote position determination terminating condition, the processor 1200 may repeat the steps S600 to S1100.

When the processor 1200 performs the steps S600 to S1100 again, the processor 1200 may confirm characteristic information of a third item which is at least one item included in a third order in this time, among the plurality of orders in step S600.

Referring to the example of FIG. 3 again, the processor 1200 may specify an order 3, which is one of the plurality of orders as a third order and specify one item F included in the third order as a third item.

Further, the processor 1200 may identify the characteristic information of the third item (that is, one item F). Here, the characteristic information of the third item refers to type information, size information, quantity information, weight information, and breakage risk information of the item F.

After the step S600, the processor may select a third tote which is at least one tote of accommodating the third item, using at least one of the type information, size information, and quantity information of the third item, among characteristic information of the third item in step S700.

The processor 1200 may select one tote (that is, tote e of FIG. 3) for accommodating one item F, using at least one of type information, size information, and the quantity information of the third item, as a third tote.

After the step S700, the processor 1200 may determine a third occupation area which is occupied by the third tote in step S800.

When the processor 1200 selects the tote e as the third tote, the processor 1200 may determine an area occupied by the tote e. Here, the area OAe occupied by the tote e become a third occupation area.

After the step S800, the processor 1200 may compare a currently accommodable area of the transport robot 200 and the third occupation area in step S900.

In the example of FIG. 6, the currently accommodable area of the transport robot 200 refers to a currently accommodable area CAA1 on the first holder 211 and a currently accommodable area CAA2 on the second holder 212.

Accordingly, the processor 1200 may compare the currently accommodable area CAA1 on the first holder 211 and the area OAe occupied by the tote e. For example, the processor 1200 may determine whether the currently accommodable area CAA1 on the first holder 211 is equal to or larger than an area OAe occupied by the tote e.

Further, the processor 1200 may compare the currently accommodable area CAA2 on the second holder 212 and the area OAe occupied by the tote e. For example, the processor 1200 may determine whether the currently accommodable area CAA2 on the second holder 212 is equal to or larger than an area OAe occupied by the tote e.

After the step S900, as a comparison result in the step S900, only when the third tote can be accommodated in the currently accommodable areas (CAA1 and CAA2) of the transport robot 200, the processor 1200 may determine the third tote position where the third tote is to be disposed on the transport robot 200 in step S1000.

In the above example, the processor 1200 may determine that the currently accommodable area CAA1 on the first holder 211 is equal to or larger than the area OAe occupied by the tote e, but the currently accommodable area CAA2 on the second holder 212 is smaller than the area OAe occupied by the tote e. In this case, the processor 1200 may determine that the third tote can be accommodated in an area CAA1 between the currently accommodable areas CAA1 and CAA2 of the transport robot 200, and determine the third tote position where the third tote is to be disposed on the transport robot 200.

Figure 7:
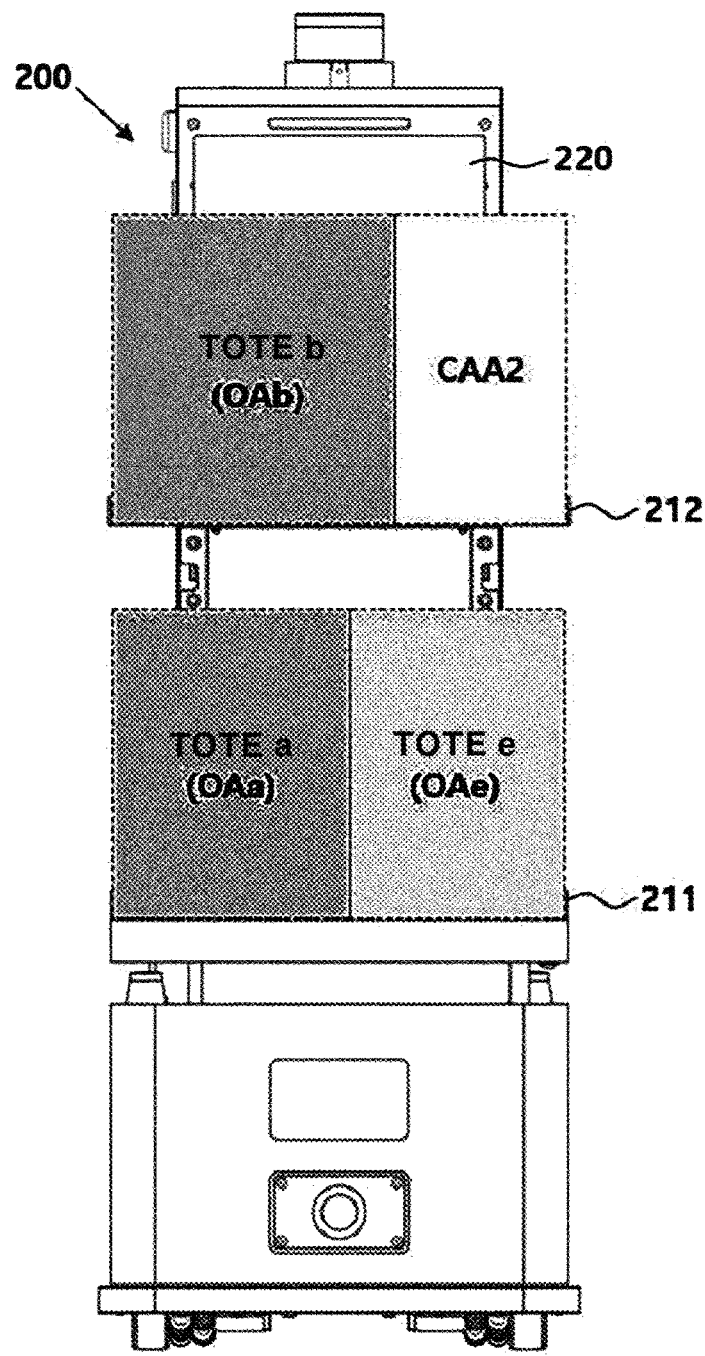
FIG. 7 illustrates that a third tote (tote e) is additionally disposed in a currently accommodable area of a transport robot of FIG. 6.

FIG. 7 illustrates that a third tote (that is, tote e) is additionally disposed in a currently accommodable area of a transport robot 200 of FIG. 6. As illustrated in FIG. 7, the processor 1200 may determine the position of the third tote (that is, tote e) to place the third tote (that is, tote e) next to the tote a on the first holder 211.

After the step S1000, the processor 1200 may determine whether to satisfy a predetermined tote position determination terminating condition again and repeat the steps S600 to S1100 until the predetermined tote position determination terminating condition is satisfied in step S1100.

As a result determined by the processor 1200, when the order processing method according to the first embodiment of the present disclosure satisfies the predetermined tote position determination terminating condition, the processor 1200 may terminate a procedure for the order processing method.

In contrast, as a result determined by the processor 1200, when the order processing method according to the first embodiment of the present disclosure does not satisfy the predetermined tote position determination terminating condition, the processor 1200 may perform the steps S600 to S1100 again. At this time, the processor 1200 may perform from a step of identifying characteristic information of a fourth item which is at least one item included in a fourth order, among a plurality of orders received from the warehouse management server 100.

As described above, the screen 220 may be provided in the transport robot 200. The processor 1200 may display the first tote position determined in the step S550 and the n-th tote position determined in the step S1000 on the screen 220 of the transport robot 200, respectively.

Figure 8:
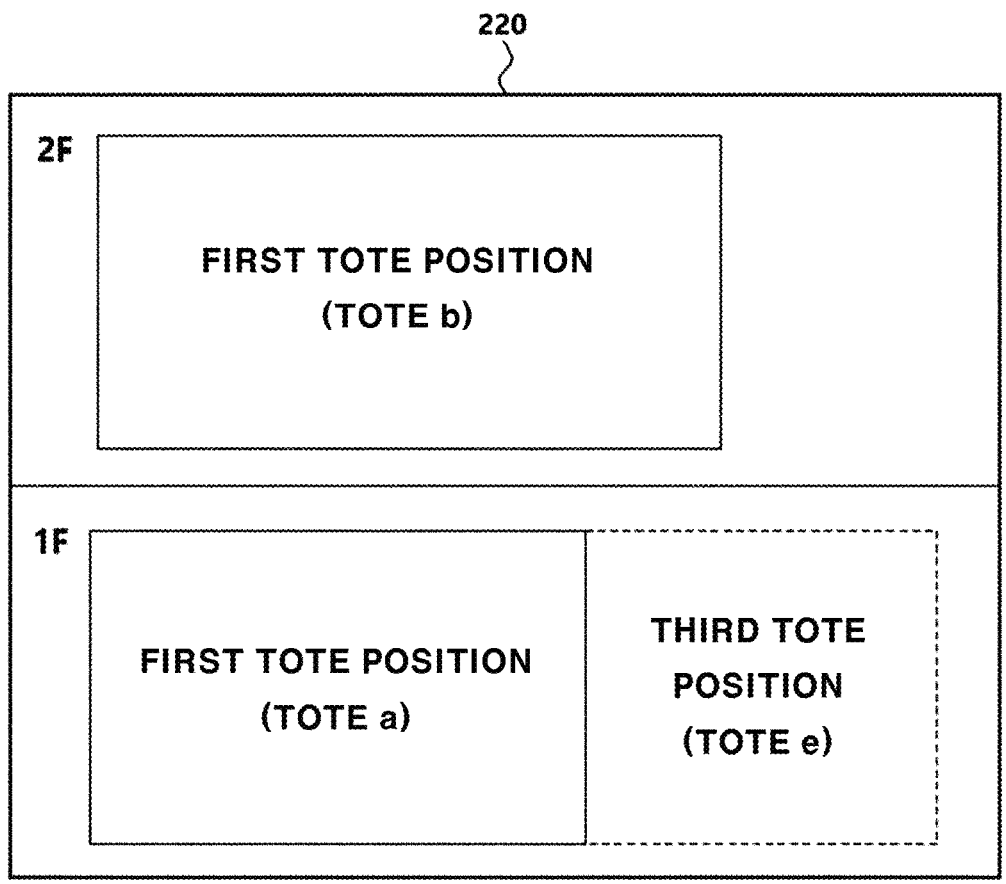
FIG. 8 is a view that a first tote position and a third tote position are displayed on a screen of a transport robot.

FIG. 8 is a view that a first tote position and a third tote position are displayed on a screen 220 of a transport robot 200.

As illustrated in FIG. 8, the processor 1200 may display the first tote position (a position where the tote a is to be disposed and a position where the tote b is to be disposed) determined in the step S500 on the screen 220 of the transport robot 200 together with the tote identification information (tote a and tote b). Further, the processor 1200 may display the third tote position (a position where the tote e is to be disposed) determined in the step S1000 on the screen 220 of the transport robot 200 together with the tote identification information (tote e).

When the first tote position and the n-th tote position are displayed on the screen 220 of the transport robot 200 together with the tote identification information, a worker who places the tote in the transport robot 200 may easily know which tote to place in which position of the transport robot 200.

Further, a worker who picks an item stored in an item storage rack in the warehouse to put the item in the tote and a worker who takes out items in a tote from a gathering point of the transport robots may also easily identify the tote based on the same order, by means of the tote position and the tote identification information which are displayed on the screen 220. Here, the gathering point means a location where the item stored in the tote is taken out.

According to the present disclosure, the operation efficiency of a worker who places the tote in the transport robot 200, a worker who picks an item stored in an item storage rack in the warehouse to put the item in the tote, and a worker who takes out the item loaded on the tote in the gathering point of the transport robots may be further improved.

The processor 1200 may display the first tote position and the n-th tote position with a marker. That is, the processor 1200 may display the first tote position on the screen 220 of the transport robot 200 with a first marker and display the n-th tote position on the screen of the transport robot 200 with an n-th marker. Here, the n-th marker may be different from the first marker.

The marker corresponds to means for distinguishing the tote position and the tote identification information on the screen 220 of the transport robot 200. As illustrated in FIG. 8, the first marker may be a solid line and the n-th marker may be a dotted line. Alternatively, the first marker may be characters having a specific meaning, such as "first tote position (tote a)" and "first tote position (tote b)" and the n-th marker may be characters having a meaning different from that of the first marker, such as "third tote position (tote e)". Alternatively, the first marker and the n-th marker may be processed with different colors.

As described above, when the first tote position and the n-th tote position are displayed with different markers on the screen 220 of the transport robot 200, a worker who places the tote in the transport robot 200, a worker who picks the item stored in the item storage rack in the warehouse to put the item in the tote, and a worker who takes out the item stored in the tote in the gathering point of the transport robot may more easily identify the totes based on the same order to improve an operation efficiency.

Alternatively, the processor 1200 may display a virtual shape of the first tote disposed in the first tote position and a virtual shape of the n-th tote disposed in the n-th tote position on the screen 220 of the transport robot 200, respectively.

Figure 9:
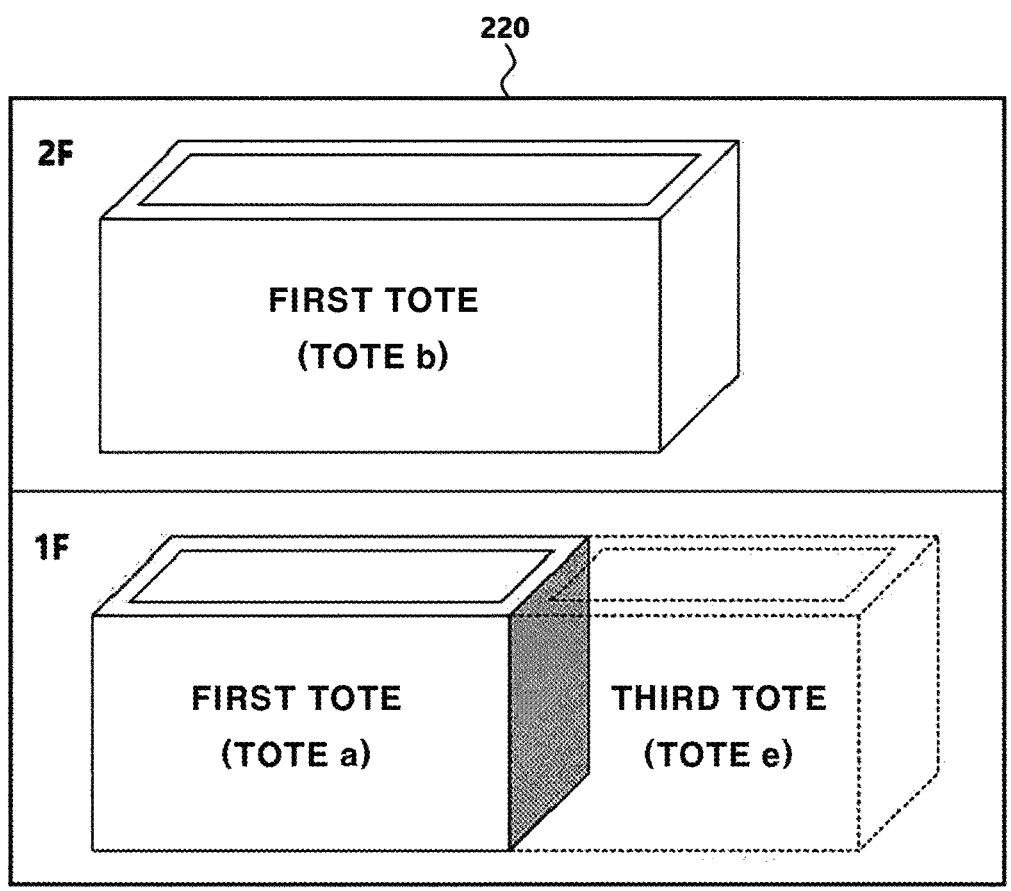
FIG. 9 is a view that a virtual shape of a first tote and a virtual shape of a third tote are displayed on a screen of a transport robot.

FIG. 9 is a view that a virtual shape of a first tote and a virtual shape of a third tote are displayed on a screen 220 of a transport robot 200.

As illustrated in FIG. 9, the processor 1200 may display a virtual shape of the first tote (tote a and tote b) disposed in the first tote position (a position where the tote a is to be disposed and a position where the tote b is to be disposed) on the screen 220 of the transport robot 200. Alternatively, the processor 1200 may display a virtual shape of the third tote (tote e) disposed in the third tote position (a position where the tote e is to be disposed) on the screen 220 of the transport robot 200.

As described above, when the virtual shape of the first tote and the virtual shape of the n-th tote are displayed on the screen 220 of the transport robot 200, a worker who places the tote in the transport robot 200, a worker who picks the item stored in the item storage rack in the warehouse to put the item in the tote, and a worker who takes out the item stored in the tote in the gathering point of the transport robot may more easily identify the totes based on the same order through the virtual tote shapes. Accordingly, according to the present disclosure, the operation efficiency of a worker who places the tote in the transport robot 200, a worker who picks an item stored in an item storage rack in the warehouse to put the item in the tote, and a worker who takes out the item loaded on the tote in the gathering point of the transport robots may be further improved.

The processor 1200 may display the virtual shape of the first tote and the virtual shape of the n-th tote with a marker. That is, the processor 1200 may display the virtual shape of the first tote on the screen 220 of the transport robot 200 with a first marker and display the virtual shape of the n-th tote on the screen of the transport robot 200 with an n-th marker. At this time, the n-th marker may be different from the first marker.

As described above, the marker refers to a mark for distinguishing the tote position and the tote identification information on the screen 220 of the transport robot 200. As illustrated in FIG. 9, the first marker may be a solid line and the n-th marker may be a dotted line. Alternatively, the first marker may be characters having a specific meaning, such as "first tote position (tote a)" and "first tote position (tote b)" and the n-th marker may be characters having a meaning different from that of the first marker, such as "third tote position (tote e)". Alternatively, the first marker and the n-th marker may be processed with different colors.

As described above, when the virtual shape of the first tote and the virtual shape of the n-th tote are displayed on the screen 220 of the transport robot 200 with markers, the worker may more easily identify the tote based on the same order so that the improvement of the operation efficiency may be expected.

In the meantime, in the step S300, it has been described that the processor 1200 may select a first tote which accommodates the first item, using at least one of the type information, size information, and quantity information of the first item, among characteristic information of the first item. However, when the weight of the item is relatively light, a tote with a smaller strength may be selected, but when the weight of the item is relatively heavy, it is advantageous to select a tote with a relatively larger strength in terms of safe transport of the item.

Accordingly, the processor 1200 desirably selects the first tote further using weight information of the first item, among the characteristic information of the first item, in the step S300. Further, the processor 1200 desirably selects the n-th tote further using weight information of the n-th item, among the characteristic information of the n-th item, in the step S700.

In the memory 1100, a lookup table in which weight information of the item and strength of the tote are recorded to be associated with each other may be stored in advance. For example, in the lookup table, weight information of the item, "20 kg or less", and tote strength, "low", are recorded to be associated with each other, weight information of the item, "over 20 kg and 50 kg or less" and tote strength, "medium", are recorded to be associated with each other, and weight information of the item, "over 50 kg" and tote strength, "high", are recorded to be associated with each other.

Accordingly, when the step S300 is performed, the processor 1200 may select a tote having a strength corresponding to the weight information of the first item as a first tote through the lookup table stored in the memory 1100. For example, when the processor 1200 identifies that the weight information of the first item is 15 kg, the processor 1200 may select a tote having a "low" strength as a first tote through the lookup table.

Further, when the step S700 is performed, the processor 1200 may select a tote having a strength corresponding to the weight information of the n-th item as an n-th tote through the lookup table stored in the memory 1100. For example, when the processor 1200 confirms that the weight information of the second item is 75 kg, the processor 1200 may select a tote having a "high" strength through the lookup table as a second tote. Further, when the processor 1200 confirms that the weight information of the third item is 50 kg, the processor 1200 may select a tote having a "medium" strength through the lookup table as a second tote.

As described above, when the processor 1200 selects the first tote and the n-th tote in consideration of the relationship between the weight information of the item and the tote strength, the item may be safely transported by the transport robot 200.

Further, when the breakage risk of the item is relatively low, there is no need to select a tote with an anti-breakage function, but when the breakage risk of the item is relatively high, it is advantageous to select a tote with an anti-breakage function (for example, a tote with a cushioning material, such as air-caps, sponges, Styrofoam) in terms of safe transport of the item.

Accordingly, the processor 1200 desirably selects the first tote further using breakage risk information of the first item, among the characteristic information of the first item, in the step S300. Further, the processor 1200 desirably selects the n-th tote further using breakage risk information of the n-th item, among the characteristic information of the n-th item, in the step S700.

In the memory 1100, a lookup table in which breakage risk information of the item and an anti-breakage efficiency of the tote are recorded to be associated with each other may be stored in advance. For example, in the lookup table, breakage risk information of the item, "30% or less", and anti-breakage efficiency, "normal", are recorded to be associated with each other, breakage risk information of the item, "over 30% and smaller than 60%" and anti-breakage efficiency, "good", are recorded to be associated with each other, and breakage risk information of the item, "over 60%" and anti-breakage efficiency, "very good", are recorded to be associated with each other.

Accordingly, when the step S300 is performed, the processor 1200 may select a tote having an anti-breakage efficiency corresponding to the breakage risk information of the first item as a first tote through the lookup table stored in the memory 1100. For example, when the processor 1200 confirms that the breakage risk information of the first item is 50%, the processor 1200 may select a tote having a "good" anti-breakage efficiency as a first tote through the lookup table.

Further, when the step S700 is performed, the processor 1200 may select a tote having the anti-breakage efficiency corresponding to the breakage risk information of the n-th item as an n-th tote through the lookup table stored in the memory 1100. For example, when the processor 1200 confirms that the breakage risk information of the second item is 90%, the processor 1200 may select a tote having a "very good" anti-breakage efficiency as a second tote through the lookup table. For example, when the processor 1200 confirms that the breakage risk information of the third item is 20%, the processor 1200 may select a tote having a "good" anti-breakage efficiency as a third tote through the lookup table.

As described above, when the processor 1200 selects the first tote and the n-th tote in consideration of the relationship between the breakage risk information of the item and the anti-breakage efficiency of the tote, the item may be safely transported by the transport robot 200.

Figure 10:
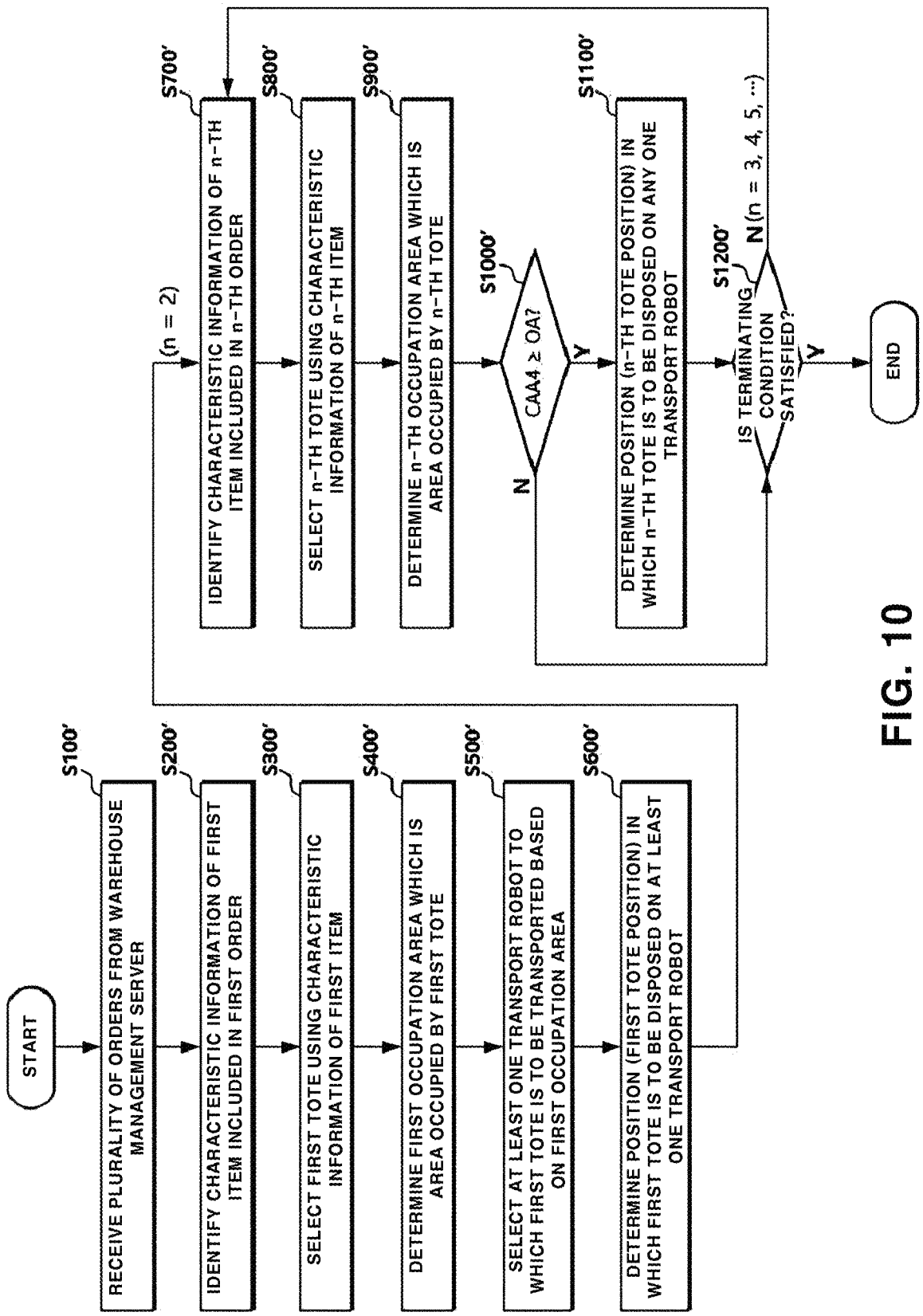
FIG. 10 is a flowchart of an order processing method according to a second embodiment of the present disclosure.

In the meantime, FIG. 10 is a flowchart of an order processing method according to a second embodiment of the present disclosure. The processor 1200 executes at least one instruction stored in the memory 1100 to perform the order processing method in the order as illustrated in FIG. 10.

The second embodiment of the present disclosure is different from the first embodiment in that a transport robot 200 is separately selected. Accordingly, the following second embodiment will be described mainly with respect to the difference from the first embodiment so that the description of the first embodiment can be applied to the second embodiment as is, unless it is directly contradictory to the first embodiment.

Referring to FIG. 10, the processor 1200 may first receive a plurality of orders from a warehouse management server 100 in step S100'.

FIG. 11 is a view illustrating a plurality of orders received by a processor 1200. As illustrated in FIG. 11, the processor 1200 may receive order 1, order 2, and order 3 from the warehouse management server 100 and each order may include at least one item. For example, order 1 may include ten items A, two items B, and one item C, order 2 may include one item D, four items E, and two items F, and order 3 may include one item G.

After the step S100', the processor 1200 may identify characteristic information of a first item which is a plurality of items included in the first order, among a plurality of orders in step S200'.

Referring to an example of FIG. 11, the processor 1200 may specify order 1 which is any one order among a plurality of orders as a first order and specify ten items A, two items B, and one item C included in the first order as a first item.

Further, the processor 1200 may identify the characteristic information of the first item (that is, ten items A, two items B, and one item C). Here, the characteristic information of the first item refers to type information, size information, quantity information, weight information, and breakage risk information of each of the item A, the item B, and the item C and the characteristic information may be identified as described above in the step S200 of the first embodiment.

After the step S200', the processor may select a first tote which is a plurality of totes of accommodating the first item, using at least one of the type information, size information, and quantity information of the first item, among characteristic information of the first item in step S300'.

In the example of FIG. 11, the processor 1200 may select one tote (that is, a tote a of FIG. 11) for accommodating five items A, one tote (that is, a tote b of FIG. 11) for accommodating another five items A, one tote (that is, a tote c of FIG. 11) for accommodating two items B, and one tote (that is, a tote d of FIG. 11) for accommodating one item C, as a first tote, using at least one of type information, size information, and quantity information of the first item. Here, the processor 1200 may select only one tote for accommodating two items B and one item C together, but may separately select a tote (that is, a tote c) for accommodating two items B and a tote (that is, a tote d) for accommodating one item C, in consideration of the breakage risk information (that is, 90%) of the item C.

After the step S300', the processor 1200 may determine an occupation area which is occupied by the first tote in step S400'.

When the processor 1200 selects the totes a, the tote b, the tote c, and the tote d as the first tote, the processor 1200 may determine an area occupied by the tote a, an area occupied by the tote b, an area occupied by the tote c, and an area occupied by the tote d, individually. Here, the area OAa occupied by the tote a, the area OAb occupied by the tote b, the area OAc occupied by the tote c, and the area OAd occupied by the tote d are first occupation areas (OAa, OAb, OAc, and OAd).

In the memory 1100, occupation area information for each tote which is selected by the processor 1200 may be stored in the memory 1100 in advance. Accordingly, when the processor 1200 performs the step S400', the processor loads the occupation area information which is stored in the memory 1100 in advance to determine the first occupation areas (OAa, OAb, OAc, and OAd).

After the step S400', the processor 1200 may select at least one transport robot to which the first totes (tote a, tote b, tote c, and tote d) are to be transported, based on the first occupation areas (OAa, OAb, OAc, and OAd) in step S500'.

Figure 12:
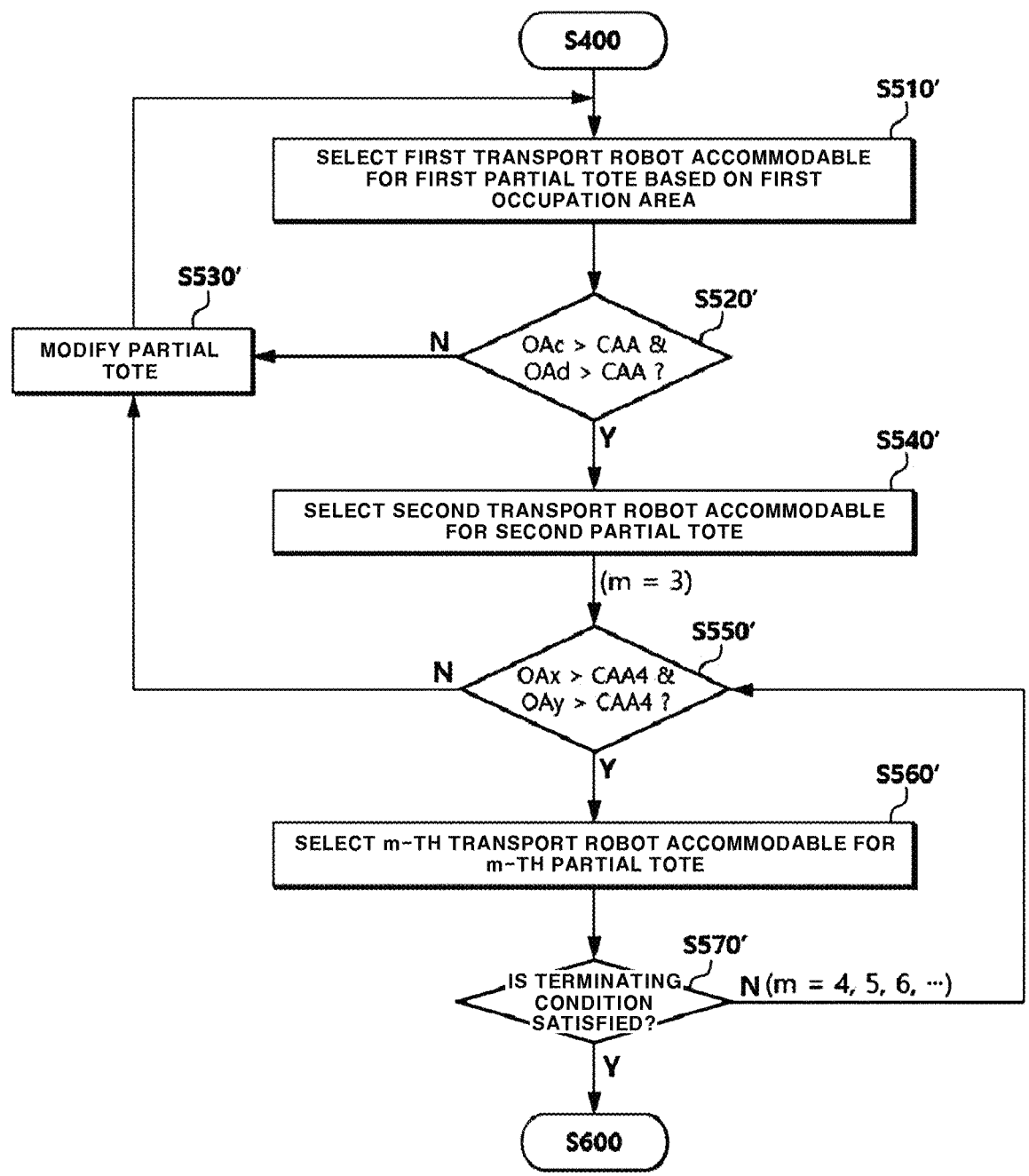
FIG. 12 is a flowchart illustrating a step S500' of FIG. 10 in detail.

FIG. 12 is a flowchart illustrating a step S500' of FIG. 10 in detail.

Referring to FIG. 12, the processor 1200 may first select a first transport robot 200-1 which is accommodable for a first partial tote (tote a and tote b) which is a part of the first totes (tote a, tote b, tote c, and tote d), based on the first occupation areas (OAa, OAb, OAc, and OAd) in step S510'.

Figure 13:
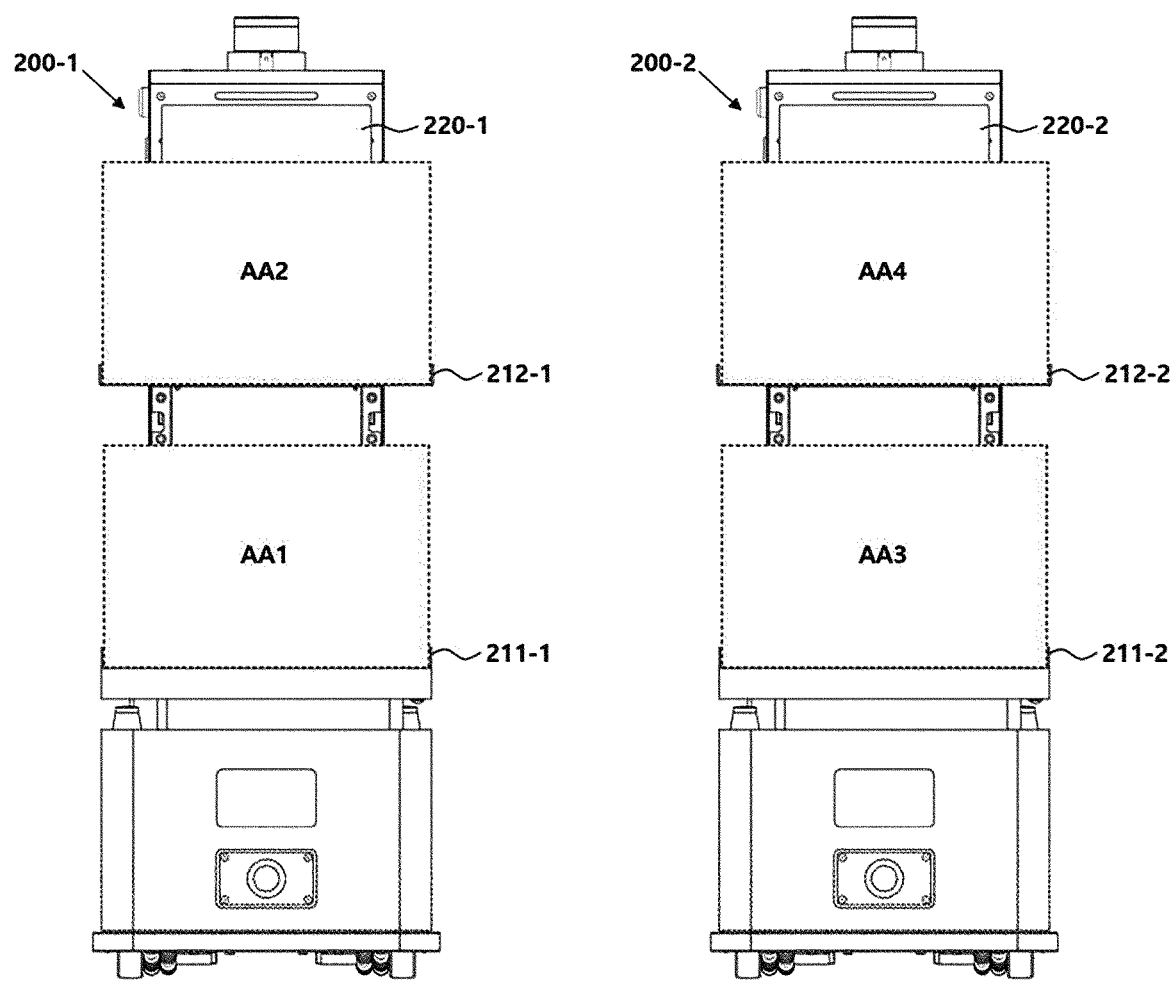
FIG. 13 is a view for explaining accommodable areas of two transport robots.

FIG. 13 is a view for explaining accommodable areas of two transport robots 200-1 and 200-2.

In the memory 1100, accommodable area information of a plurality of transport robots 200-1 and 200-2 as illustrated in FIG. 13 may be stored in advance. To be more specific, in the memory 1100, information about an accommodable area on a first holder 211-1 and a second holder 212-1 of the first transport robot 200-1 and information about an accommodable area on a first holder 211-2 and a second holder 212-2 of the second transport robot 200-2 may be stored in advance.

As illustrated in FIG. 13, the accommodable area on the first holder 211-1 of the first transport robot 200-1 may be AA1 and the accommodable area on the second holder 212-1 may be AA2. Further, the accommodable area on the first holder 211-2 of the second transport robot 200-2 may be AA3 and the accommodable area on the second holder 212-2 may be AA4.

The processor 1200 may select a transport robot which can accommodate the largest number of totes (tote a and tote b), among the first totes (tote a, tote b, tote c, and tote d), based on the accommodable areas (AA1, AA2; AA3, AA4) of a plurality of transport robots 200-1 and 200-2, together with the first occupation areas (OAa, OAb, OAc, and OAd). At this time, some totes accommodable in the first transport robot 200-1 become first partial totes (tote a and tote b).

Alternatively, if an arbitrary transport robot can accommodate only some totes, among the first totes (tote a, tote b, tote c, and tote d), the processor 1200 may select the transport robot as a first transport robot 200-1, based on the accommodable areas (AA1, AA2; AA3, AA4) of the plurality of transport robots 200-1 and 200-2, together with the first occupation areas (OAa, OAb, OAc, and OAd). Also, at this time, some totes accommodable in the first transport robot 200-1 become first partial totes (tote a and tote b).

However, this is only an example of performing the step S510' by the processor 1200 and the processor 1200 may select a first transport robot 200-1 which is accommodable for the first partial tote (tote a and tote b) in various ways.

The processor 1200 may perform the step S600' after waiting until the step S500' completely ends. Here, the step S600' refers to a step of determining a first tote position where the first totes (tote a, tote b, tote c, and tote d) are to be disposed on at least one transport robot by the processor 1200.

However, when the processor 1200 selects the transport robot (that is, the first transport robot 200-1) as in the step S510', there is no need to perform the step S600' after waiting until the step S500' completely ends. That is, when the processor 1200 selects the transport robot in the step S500', the processor 1200 may perform at least partially the step S600' even before the step S500' completely ends.

When the processor 1200 selects the first transport robot 200-1 in step S510', even before the step S500' completely ends, a position where the first partial totes (tote a and tote b), among the first totes (tote a, tote b, tote c, and tote d), are to be disposed on the first transport robot 200-1 may be determined.

Further, when the processor 1200 selects the second transport robot 200-2 in step S540' to be described below, even before the step S500' completely ends, a position where the second partial totes (tote c and tote d), among the first totes (tote a, tote b, tote c, and tote d), are to be disposed on the second transport robot 200-2 may be determined.

In this way, the processor 1200 may at least partially perform the step S600' even before the step S500' completely ends so that the step S600' may also end as soon as the step S500' ends.

Figure 14:
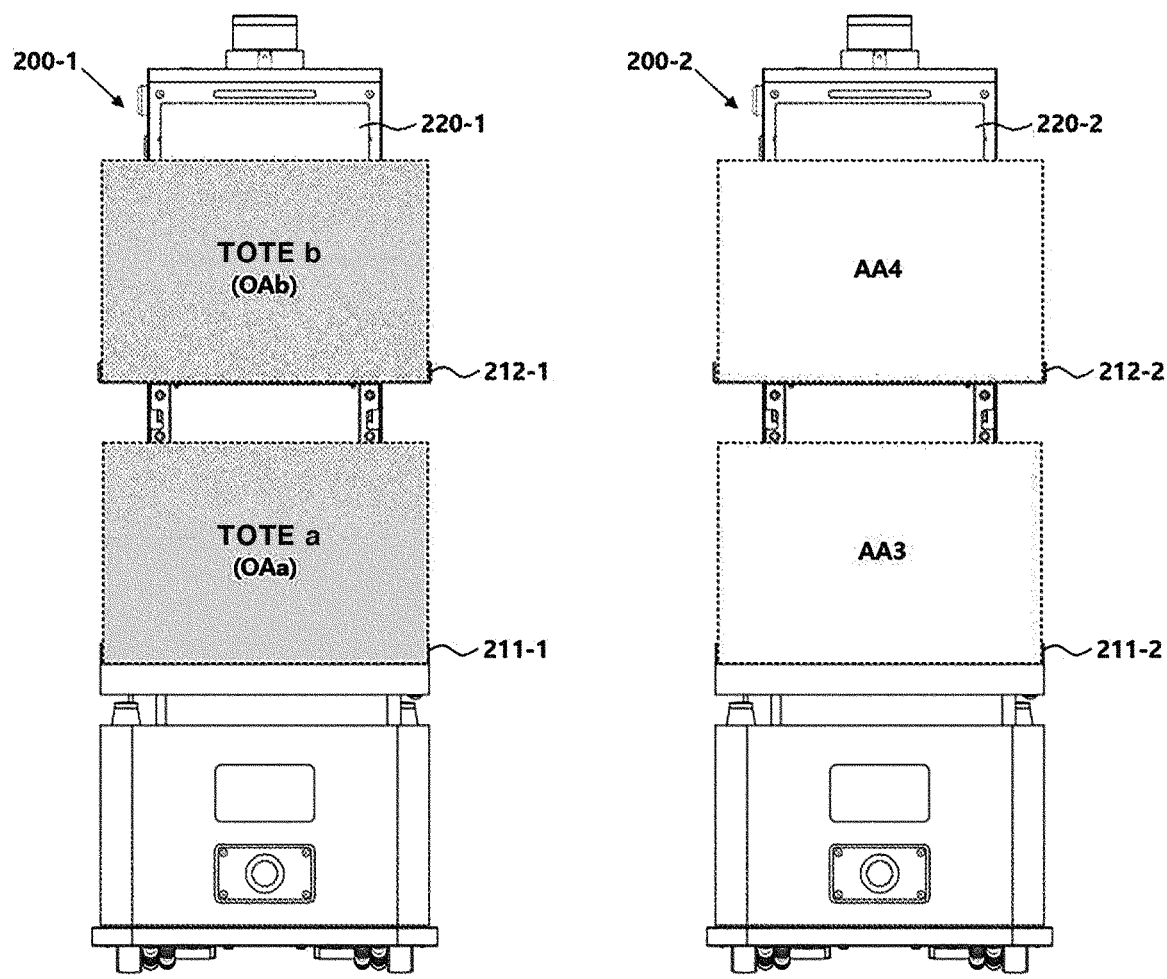
FIG. 14 illustrates that first partial totes (tote a and tote b) are disposed in an accommodable area of a first transport robot of FIG. 13.

FIG. 14 illustrates that first partial totes (tote a and tote b) are disposed in the accommodable area of a first transport robot 200-1 of FIG. 13.

When the processor 1200 selects the first transport robot 200-1 which is accommodable for the first partial totes (tote a and tote b) in the step S510', as illustrated in FIG. 14, the processor may determine a position where the first partial totes (tote a and tote b) are to be disposed on the first transport robot 200-1, based on the occupation areas (OAa and OAb) of the first partial totes (tote a and tote b).

To be more specific, the processor 1200 may determine whether the accommodable area AA1 on the first holder 211-1 is equal to or larger than an area OAa occupied by the tote a.

As a result determined by the processor 1200, when the accommodable area AA1 on the first holder 211-1 is equal to or larger than the area OAa occupied by the tote a, the processor 1200 may determine the position of the tote a to dispose the tote a on the first holder 211-1. At this time, the processor 1200 may determine the position of the tote a so that the tote a is disposed over the entire accommodable area AA1 on the first holder 211-1.

Thereafter, the processor 1200 may determine whether the accommodable area AA2 on the second holder 212-1 is equal to or larger than an area OAb occupied by the tote b.

As a result determined by the processor 1200, when the accommodable area AA2 on the second holder 212-1 is equal to or larger than the area OAb occupied by the tote b, the processor 1200 may determine the position of the tote b to place the tote b on the second holder 212-1. At this time, the processor 1200 may determine the position of the tote a so that the tote b is disposed over the entire accommodable area AA1 on the second holder 212-1.

Thereafter, the processor 1200 may determine whether areas (OAc and Oad) occupied by the totes (tote c and tote d) excluding the first partial totes (tote a and tote b), among the first totes (tote a, tote b, tote c, and tote d), exceed a currently accommodable area of the first transport robot 200-1 (in embodiments, there may be a currently accommodable area CAA of the first transport robot 200-1) in step S520'.

As a result determined by the processor 1200, if the areas (OAc and OAd) occupied by each of the totes (tote c and tote d) excluding the first partial totes (tote a and tote b), among the first totes (tote a, tote b, tote c, and tote d), do not exceed a currently accommodable area CAA of the first transport robot 200-1, it means that at least any one of the totes (tote d and tote e) can be accommodated in the currently accommodable area CAA of the first transport robot 200-1.

For example, when an area OAc occupied by the tote c exceeds the currently accommodable area CAA of the first transport robot 200-1, it means that the tote c cannot be accommodated in the currently accommodable area CAA of the first transport robot 200-1.

In contrast, when an area OAd occupied by the tote d is equal to or smaller than the currently accommodable area of the first transport robot 200-1, it means that the tote d can be accommodated in the currently accommodable area of the first transport robot 200-1.

In this case, the processor 1200 may modify the first partial tote from tote a and tote b to tote a, tote b, and tote d in accordance with the step S530', and perform the procedure from the step S510' again.

However, hereinafter, it is assumed that an area OAc occupied by the tote c and an area OAd occupied by the tote d exceed the currently accommodable area CAA of the first transport robot 200-1.

After the step S520', the processor 1200 may select a second transport robot 200-2 which can accommodate second partial totes (tote c and tote d) which are partial totes, among the first totes (tote a, tote b, tote c, and tote d), only when areas (OAc and Oad) occupied by the totes (tote c and tote d), excluding the first partial totes (tote a and tote b), among the first totes (tote a, tote b, tote c, and tote d), exceed all the currently accommodable area CAA of the first transport robot 200-1 in step S540'. Here, the second partial totes (tote c and tote d) are different from the first partial totes (tote a and tote b).

In the above example, when the area OAc occupied by the tote c and the area OAd occupied by the tote d exceed the currently accommodable area CAA of the first transport robot 200-1, it means that any of the tote c and tote d cannot be accommodated in the currently accommodable area CAA of the first transport robot 200-1. In this case, the processor 1200 may select the second transport robot 200-2 to accommodate the tote c and the tote d. At this time, the processor 1200 may select the second transport robot 200-2 which can accommodate the second partial totes (tote c and tote d), in the same manner as or in the different manner from the method described above in the step S510'.

Figure 15:
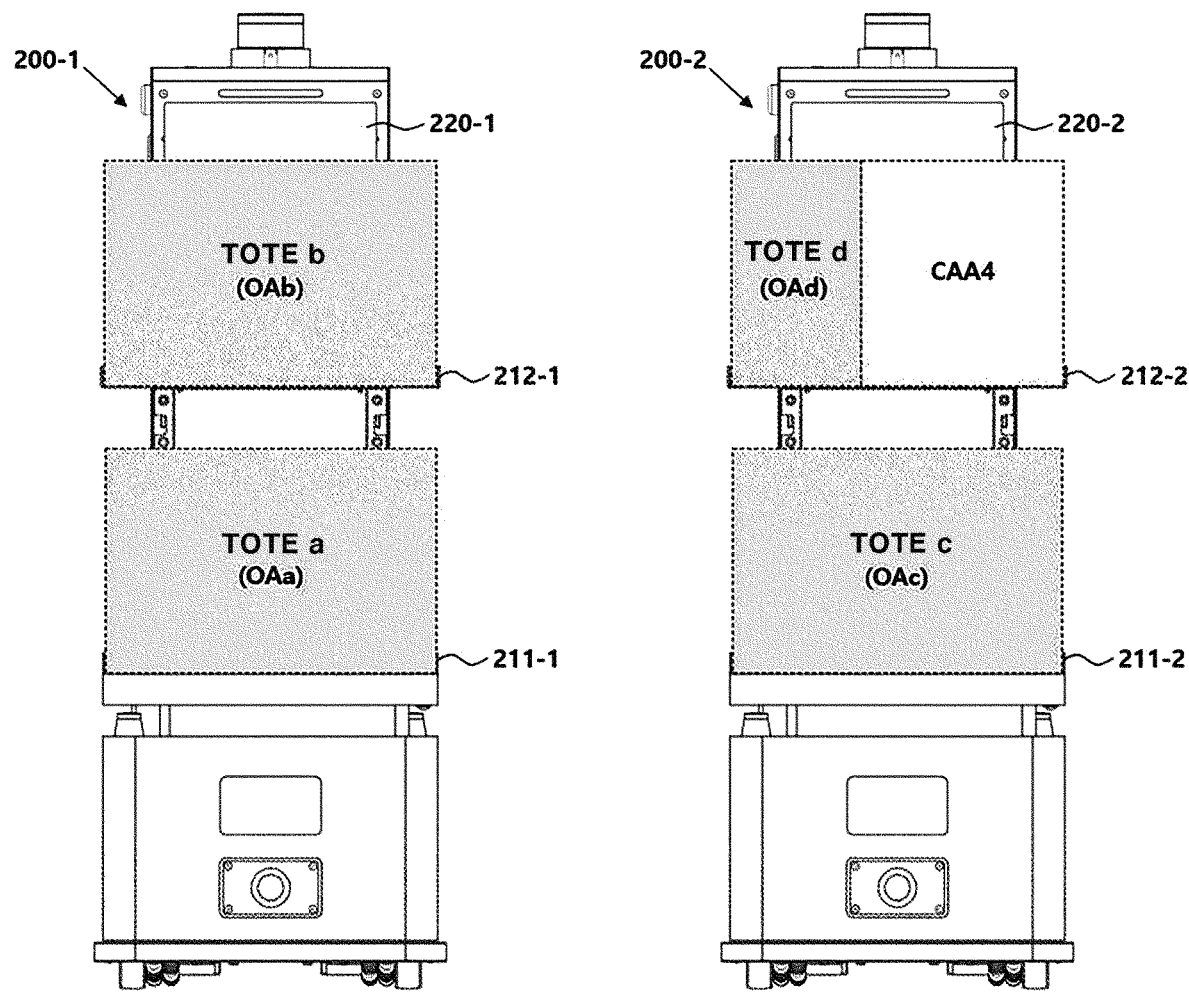
FIG. 15 illustrates that second partial totes (tote c and tote d) are disposed in an accommodable area of a second transport robot of FIG. 14.

FIG. 15 illustrates that second partial totes (tote c and tote d) are disposed in the accommodable area of a second transport robot 200-2 of FIG. 14.

When the processor 1200 selects the second transport robot 200-2 which is accommodable for the second partial totes (tote c and tote d) in the step S540', as illustrated in FIG. 15, the processor may determine a position where the second partial totes (tote c and tote d) are to be disposed on the second transport robot 200-2, based on the occupation areas (OAc and Oad) of the second partial totes (tote c and tote d).

To be more specific, the processor 1200 may determine whether the accommodable area AA4 on the second holder 212-2 is equal to or larger than an area OAd occupied by the tote d.

As a result determined by the processor 1200, when the accommodable area AA4 on the second holder 212-2 is equal to or larger than the area OAd occupied by the tote d, the processor 1200 may determine the position of the tote d to place the tote d on the second holder 212-2. At this time, the processor 1200 may determine the position of the tote d so that the tote d is disposed at a point tilted to the left on the second holder 212-2.

Thereafter, by assuming that the tote d is disposed on the second holder 212-2, the processor 1200 may determine whether the currently accommodable area (that is, CAA4: an area obtained by subtracting OAd from AA4) on the second holder 212-2 is equal to or larger than the area OAc occupied by the tote c.

In contrast, as a result determined by the processor 1200, when the currently accommodable area CAA4 on the second holder 212-2 is smaller than the area OAc occupied by the tote c, the processor 1200 may determine whether the accommodable area AA3 on the first holder 211-2 is equal to or larger than the area OAc occupied by the tote c by considering that the tote c cannot be disposed on the second holder 212-2.

As a result determined by the processor 1200, when the accommodable area AA3 on the first holder 211-2 is equal to or larger than the area OAc occupied by the tote c, the processor 1200 may determine the position of the tote c to place the tote c on the first holder 211-2. At this time, the processor 1200 may determine the position of the tote c so that the tote c is disposed over the entire accommodable area AA3 on the first holder 211-2.

In the same manner as the above-described steps S510' to S540', the processor 1200 may select a third transport robot and a fourth transport robot to which the first tote is to be transported, which will be generalized as follows.

After the step S540', the processor 1200 may determine whether an area occupied by each tote, excluding first to m-1-th partial totes, among the first totes, exceeds a currently accommodable area of the m-1-th transport robot in step S550'.

Here, m is a natural number applied in an ascending order from 3, based on the number of times of performing the steps S540' to S560'. That is, when the number of times of performing the steps S540' to S560' is one, m is 3, when the number of times of performing the steps S540' to S560' is two, m is 4, and when the number of times of performing the steps S540' to S560' is three, m is 5.

When m is 3, the processor 1200 may determine whether an area occupied by each tote excluding the first and second partial totes, among the first totes, exceeds the currently accommodable area CAA4 of the second transport robot 200-2.

Even though in FIG. 11, it is not described as an example, when it is assumed that as a tote which corresponds to the first tote, but does not correspond to the first and second partial totes (tote a, tote b, tote c, and tote d), there are tote x and tote y, the processor 1200 may determine whether areas (OAx and OAy) occupied by the tote x and tote y exceed a currently accommodable area CAA4 of the second transport robot 200-2.

As a result determined by the processor 1200, when an area OAx occupied by the tote x exceeds the currently accommodable area CAA4 of the second transport robot 200-2, it means that the tote x cannot be accommodated in the currently accommodable area CAA4 of the second transport robot 200-2.

In contrast, when an area OAy occupied by the tote y is equal to or smaller than the currently accommodable area CAA4 of the second transport robot 200-2, it means that the tote y can be accommodated in the currently accommodable area CAA4 of the second transport robot 200-2.

In this case, the processor 1200 may modify the second partial tote from tote c and tote d to tote c, tote d, and tote y in accordance with the step S530', and perform the procedure from the step S510' again. However, this is merely an example of the present disclosure, and the processor 1200 may be changed in any way, such as performing the procedure again from the step S540', rather than the step S510'.

Hereinafter, it is assumed that an area OAx occupied by the tote x and an area OAy occupied by the tote y exceed the currently accommodable area CAA4 of the second transport robot 200-2.

After the step S550', the processor 1200 may select an m-th transport robot which can accommodate an m-th partial tote which is a partial tote of the first tote only when an area occupied by each of the totes excluding the first to m-1-th partial totes, among the first totes, exceeds all currently accommodable area of the m-1-th transport robot in step S560'. Here, the m-th partial tote is different from the 1 to m-1-th partial totes.

In the above example, when the area OAx occupied by the tote x and the area OAy occupied by the tote y exceed the currently accommodable area CAA4 of the second transport robot 200-2, it means that any of the tote x and tote y cannot be accommodated in the currently accommodable area CAA4 of the second transport robot 200-2. In this case, the processor 1200 may select the third transport robot to accommodate the tote x and the tote y.

After the step S550', the processor 1200 may determine whether to satisfy a predetermined robot selection terminating condition and repeat the steps S540' to S570' until the predetermined robot selection terminating condition is satisfied in step S570'.

Here, the robot selection terminating condition may be set in the memory 1100 in advance so that the processor 1200 loads the terminating condition set in the memory 1100 in advance to perform the step S560'. The robot selection terminating condition may be implemented in various forms, such as when selection of a transport robot to which the first tote is transported is completed, when the number of timings of repeatedly performing the steps S540' to S570 reaches the number of timings of repeatedly performing set in the memory 110 in advance, when a time to perform the order processing method exceeds a time set in the memory 1100 in advance, or the like.

When the steps S100' to S600' are completed, as illustrated in FIG. 15, all the first tote positions where the first totes (tote a, tote b, tote c, and tote d) are to be disposed on at least one transport robot 200-1 and 200-2 may be determined. According to the present disclosure, a worker who places the tote may easily know which tote to place in which position by utilizing which transport robot so that the operation efficiency of the worker may be significantly improved.

In the meantime, it has been described that the processor 1200 may select a transport robot 200 to which the first tote is to be transported based on the first occupation area, in the step S500'. However, in every warehouse, a distance between item storage racks, that is, an aisle width through which the transport robot 200 passes may be different.

In order to transport as many items as possible to a gathering point at one time, the processor 1200 desirably selects a transport robot 200 with a larger holder. However, if a transport robot 200 with a large holder is selected despite the narrow aisle width, the order processing becomes impossible.

Accordingly, the processor 1200 may determine the aisle width between the item storage racks in which the items are placed in the warehouse based on warehouse map information stored in the memory 1100 and position information of the item in the warehouse received from the warehouse management server 100.

In the memory 1100, a lookup table in which an aisle width and a holder width of the transport robot 200 are recorded to be associated with each other may be stored in advance. For example, in the lookup table, an aisle width of "1 m or less" and a holder width of the transport robot 200 of "50 cm" are recorded to be associated with each other and an aisle width of "larger than 1 m" and a holder width of the transport robot 200 of "80 cm" are recorded to be associated with each other.

Accordingly, when the processor 1200 selects the transport robot in the step S500', the processor 1200 may select the transport robot 200 with a holder width corresponding to the determined aisle width, through the lookup table in which the aisle width and the holder width of the transport robot 200 are recorded to be associated with each other. For example, when the aisle width is determined to be 1.5 m, the processor 1200 may select a transport robot 200 with a holder width of 80 cm through the lookup table.

In the meantime, the processor 1200 may select a plurality of transport robots to which the first tote is to be transported in the step S500'. In this case, first totes based on the first order are divided into a plurality of transport robots 200-1 and 200-2 so that the first items are also loaded to be divided into the plurality of transport robots 200-1 and 200-2.

However, since the first order is made by the same orderer, a worker who picks the item stored in the item storage rack to put the item in the tote and a worker who takes out the item stored in the tote in the gathering point should know that an item for which the worker works is based on the same orderer.

To this end, the processor 1200 may display with the same marker on the plurality of transport robots selected in the step S500'. For example, when the processor 1200 determines the tote position to separately place the first totes (tote a, tote b, tote c, and tote d) based on the first order into the first transport robot 200-1 and the second transport robot 200-2, the processor 1200 may control light emitting units of the first transport robot 200-1 and the second transport robot 200-2 to allow the first transport robot 200-1 and the second transport robot 200-2 to emit the same light.

Further, when the processor 1200 selects a plurality of transport robots to which the first tote is to be transported in the step S500', the processor 1200 may control the plurality of transport robots 200-1 and 200-2 to be disposed to be adjacent to each other in the gathering point in the step S500'. Here, when the plurality of transport robots is disposed to be adjacent to each other in the gathering point, it means that when totes based on one order are accommodated to be divided into a plurality of transport robots, the plurality of robots stops in a plurality of robot stop positions, which are continuously disposed each other.

For example, when the processor 1200 determines the tote position to separately place the first totes based on the first order into the first transport robot 200-1 and the second transport robot 200-2 as illustrated in FIG. 15, the processor 1200 controls the driving of the first transport robot 200-1 and the second transport robot 200-2 to allow the first transport robot 200-1 and the second transport robot 200-2 to be disposed to be adjacent to each other in the gathering point.

As described above, when the first transport robot 200-1 and the second transport robot 200-2 are disposed to be adjacent to each other in the gathering point, a gathering point worker just takes out items based on the same orderer from the totes accommodated in the adjacent transport robots 200-1 and 200-2 so that the operation efficiency may be improved.

In the meantime, as illustrated in FIG. 15, when the processor 1200 selects a plurality of transport robots to which the first totes are to be transported in the step S500', any one transport robot has a sufficient area (for example, CAA4) to additionally accommodate the item. Accordingly, the processor 1200 further performs the steps S700' to S1200' after the step S600' to allow the transport robot 200-2 to process additional orders.

To this end, after the step S600', the processor 1200 may identify characteristic information of an n-th item which is at least one item included in the n-th order, among a plurality of orders in step S700'.

Here, n is a natural number applied in an ascending order from 2, based on the number of times of performing the steps S700' to S1200'. That is, when the number of times of performing the steps S700' to S1200' is one, n is 2, when the number of times of performing the steps S700' to S1200' is two, n is 3, and when the number of times of performing the steps S700' to S1200' is three, n is 4.

When it is assumed that the number of times of performing the steps S700' to S1200' is one, the processor 1200 may confirm the characteristic information of a second item which is at least one item included in a second order, among the plurality of orders.

Referring to an example of FIG. 11 again, the processor 1200 may specify an order 2 which is one of a plurality of orders as a second order and specify one item D, four items E, and two items F included in the second order as a second item.

Further, the processor 1200 may identify the characteristic information of the second item (that is, one item D, four items E, and two items F). Here, the characteristic information of the second item refers to type information, size information, quantity information, weight information, and breakage risk information of each of the item D, the item E, and the item F.

After the step S700', the processor 1200 may select an n-th tote which is at least one tote of accommodating the n-th item, using at least one of the type information, size information, and quantity information of the n-th item, among characteristic information of the n-th item in step S800'.

In the above-described example, the processor 1200 may determine that it is desirable to accommodate one item D and two items F together in one tote using at least one of the type information, the size information, and the quantity information of the second item and to accommodate four items E in a separate tote. In this case, the processor 1200 may select one tote (that is, tote e of FIG. 11) for accommodating one item D and two items F and one tote (that is, tote f of FIG. 11) for accommodating four items E as a second tote.

After the step S800', the processor 1200 may determine an n-th occupation area which is occupied by the n-th tote in step S900'.

As described above, in the memory 1100, occupation area information for each tote which is selected by the processor 1200 may be stored in the memory 1100 in advance. Accordingly, when the processor 1200 performs the step S900', the processor loads the occupation area information which is stored in the memory 1100 in advance to determine the n-th occupation area.

When the processor 1200 selects the tote e and the tote f as the second tote, an area OAe occupied by the tote e and an area OAf occupied by the tote f may be determined, respectively. Here, the area OAe occupied by the tote e and the area OAf occupied by the tote f become the second occupation area.

After the step S900', the processor 1200 may compare a currently accommodable area CAA4 of any one transport robot 200-2, among the plurality of transport robots 200-1 and 200-2 selected in the step S500' and the n-th occupation area in step S1000'.

The processor 1200 may compare a currently accommodable area CAA4 of any one transport robot 200-2, among the plurality of transport robots 200-1 and 200-2 selected in the step S500' and the second occupation areas (OAe and OAf). However, in some cases, the processor 1200 may also compare a currently accommodable area of the transport robot 200-1, rather than the transport robot 200-2, and the second occupation areas (OAe and OAf).

For example, the processor 1200 may determine whether the currently accommodable area CAA4 of the transport robot 200-2 is equal to or larger than an area OAe occupied by the tote e. Further, the processor 1200 may determine whether the currently accommodable area CAA4 of the transport robot 200-2 is equal to or larger than an area OAf occupied by the tote f.

After the step S1000', as a comparison result in the step S1000', only when the n-th tote can be accommodated in the currently accommodable area CAA4 of any one transport robot 200-2, the processor 1200 may determine the n-th tote position where the n-th tote is to be disposed on any one transport robot 200-2 in step S1100'.

In the above example, when the processor 1200 determines that the currently accommodable area CAA4 of the transport robot 200-2 is smaller than the area OAe occupied by the tote e, the processor 1200 may determine that it is not possible to accommodate the second tote in the currently accommodable area CAA4 of the transport robot 200-2 to perform the step S1200'.

Alternatively, when the processor 1200 determines that the currently accommodable area CAA4 of the transport robot 200-2 is smaller than the area OAf occupied by the tote f, the processor 1200 may determine that it is not possible to accommodate the second tote in the currently accommodable area CAA4 of the transport robot 200-2 to perform the step S1200'.

That is, when the processor 1200 determines that the currently accommodable area CAA4 of the transport robot 200-2 cannot accommodate all the n-th tote (in the above example, tote e and tote f corresponding to the second tote), the processor 1200 may perform the step S1200'. By doing this, items from the same order are prevented from being loaded on different transport robots as much as possible, thereby contributing to improving the operation efficiency of the worker.

After the step S1100', the processor 1200 may determine whether to satisfy a predetermined tote position determination terminating condition and repeat the steps S700' to S1200' until the predetermined tote position determination terminating condition is satisfied in step S1200'.

Here, the tote position determination terminating condition may be set in the memory 1100 in advance so that the processor 1200 may load the tote position determination terminating condition set in the memory 1100 in advance to perform the step S1200'.

The tote position determination terminating condition may be implemented in various examples, such as, when the currently accommodable area of the transport robot is smaller than an area set in the memory 1100 in advance, when the number of times of repeatedly performing the steps S700' to S1200' reaches the number of times of repeatedly performing the steps set in the memory 1100 in advance, when a time to perform the order processing method exceeds a time set in the memory 1100 in advance, or the like.

As a result determined by the processor 1200, when the order processing method according to the second embodiment of the present disclosure satisfies the predetermined tote position determination terminating condition, the processor 1200 may terminate a procedure for the order processing method.

In contrast, as a result determined by the processor 1200, when the order processing method according to the second embodiment of the present disclosure does not satisfy the predetermined tote position determination terminating condition, the processor 1200 may repeat the steps S700' to S1200'.

When the processor 1200 performs the steps S700' to S1200' again, the processor 1200 may confirm characteristic information of a third item which is at least one item included in a third order in this time, among the plurality of orders in step S700'.

Referring to the example of FIG. 11 again, the processor 1200 may specify an order 3, which is one of the plurality of orders as a third order and specify one item G included in the third order as a third item.

Further, the processor 1200 may identify the characteristic information of the third item (that is, one item G). Here, the characteristic information of the third item refers to type information, size information, quantity information, weight information, and breakage risk information of the item G.

After the step S700', the processor 1200 may select a third tote which is at least one tote of accommodating the third item, using at least one of the type information, size information, and quantity information of the third item, among characteristic information of the third item in step S800'.

The processor 1200 may select one tote (that is, tote g of FIG. 11) for accommodating one item G, using at least one of type information, size information, and the quantity information of the third item, as a third tote.

After the step S800', the processor 1200 may determine a third occupation area which is occupied by the third tote in step S900'.

When the processor 1200 selects the tote g as the third tote, the processor 1200 may determine an area occupied by the tote g. Here, the area OAg occupied by the tote g becomes a third occupation area.

After the step S900', the processor 1200 may compare a currently accommodable area CAA4 of any one transport robot 200-2, among the plurality of transport robots 200-1 and 200-2 selected in the step S500' and the third occupation area OAg in step S1000'.

The processor 1200 may compare a currently accommodable area CAA4 of any one transport robot 200-2, among the plurality of transport robots 200-1 and 200-2 selected in the step S500' and the third occupation area OAg. However, in some cases, the processor 1200 may compare a currently accommodable area of the transport robot 200-1, rather than the transport robot 200-2, and the second occupation areas (OAe and OAf).

For example, the processor 1200 may determine whether the currently accommodable area CAA4 of the transport robot 200-2 is equal to or larger than an area OAg occupied by the tote g.

After the step S1000', as a comparison result in the step S1000', only when the third tote can be accommodated in the currently accommodable area CAA4 of any one transport robot 200-2, the processor 1200 may determine the third tote position where the third tote is to be disposed on any one transport robot 200-2 in step S1100'.

In the above example, the processor 1200 may determine that the currently accommodable area CAA4 of the transport robot 200-2 is equal to or larger than an area OAg occupied by the tote g. In this case, the processor 1200 may determine that the third tote can be accommodated in the currently accommodable area CAA4 of the transport robot 200-2, and determine the third tote position where the third tote is to be disposed on the transport robot 200-2.

Figure 16:
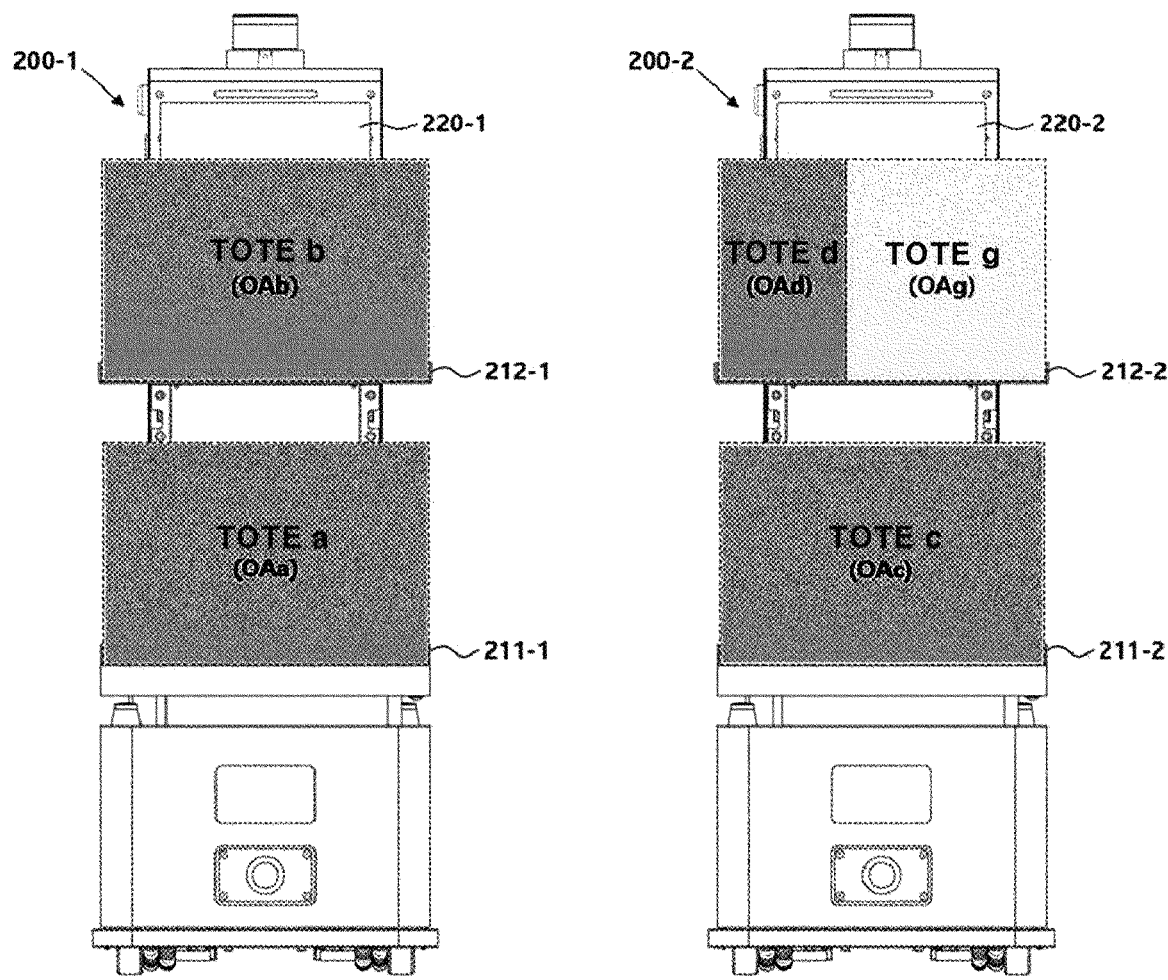
FIG. 16 illustrates that a third tote (tote g) is additionally disposed in a currently accommodable area of a transport robot of FIG. 15.

FIG. 16 illustrates that a third tote (that is, tote g) is additionally disposed in a currently accommodable area CAA4 of a transport robot 200-2 of FIG. 15. As illustrated in FIG. 16, the processor 1200 may determine the position of the third tote (that is, tote g) to place the third tote (that is, tote g) next to the tote d on the second holder 212-2 of the transport robot 200-2.

After the step S1100', the processor 1200 may determine whether to satisfy a predetermined tote position determination terminating condition again and repeat the steps S600' to S1100' until the predetermined tote position determination terminating condition is satisfied in step S1100'.

As a result determined by the processor 1200, when the order processing method according to the second embodiment of the present disclosure satisfies the predetermined tote position determination terminating condition, the processor 1200 may terminate a procedure for the order processing method.

In contrast, as a result determined by the processor 1200, when the order processing method according to the second embodiment of the present disclosure does not satisfy the predetermined tote position determination terminating condition, the processor 1200 may perform the steps S700' to S1200' again. At this time, the processor 1200 may perform from a step of identifying characteristic information of a fourth item which is at least one item included in a fourth order, among a plurality of orders received from the warehouse management server 100.

In the meantime, the processor 1200 may display the first tote position determined in the step S600' on the screens 220-1 and 220-2 of at least one transport robot 200-1 and 200-2. Further, the processor 1200 may display the n-th tote position determined in the step S1100' on the screen 220-2 of the transport robot 200-2.

Figure 17:
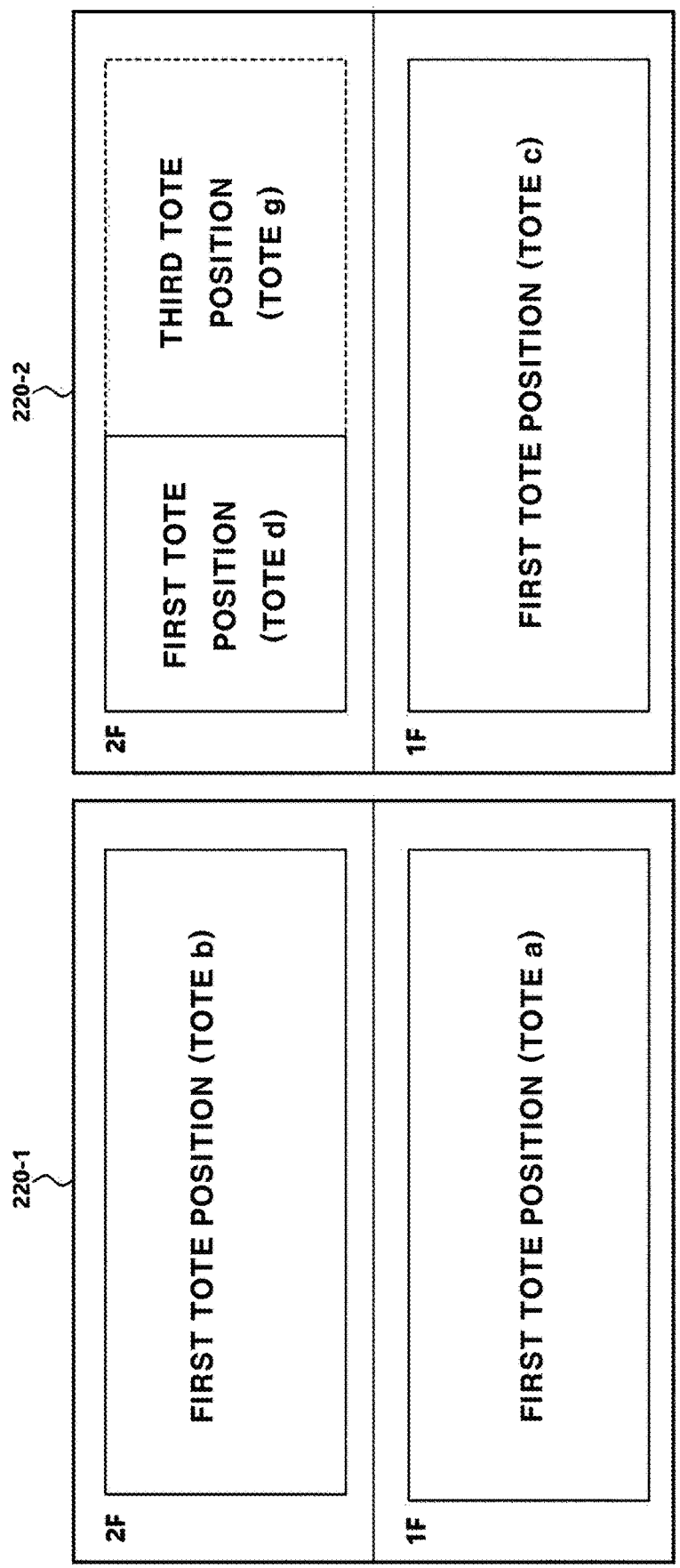
FIG. 17 is a view illustrating that a first tote position is displayed on a screen of a first transport robot and a first tote position and a third tote position are displayed on a screen of a second transport robot.

FIG. 17 is a view illustrating that a first tote position is displayed on a screen 220-1 of a first transport robot 200-1 and a first tote position and a third tote position are displayed on a screen of a second transport robot 200-2.

As illustrated in FIG. 17, the processor 1200 may display first tote positions (a position where tote a, tote b, tote c, and tote d are to be disposed) determined in the step S600' on the screens 220-1 and 220-2 of the first and second transport robots 200-1 and 200-2 together with the tote identification information (tote a, tote b, tote c, and tote d). Further, the processor 1200 may display the third tote position (a position where the tote g is to be disposed) determined in the step S1100' on the screen 220-2 of the second transport robot 200-2 together with the tote identification information (tote g).

The processor 1200 may display the first tote position and the n-th tote position with a marker. That is, the processor 1200 may display the first tote position determined in the step S600' on the screens 220-1 and 220-2 of the first and second transport robots 200-1 and 200-2 with a first marker and display the n-th tote position determined in the step S1100' on the screen of the second transport robot 200-2 with an n-th marker. Here, the n-th marker may be different from the first marker.

As illustrated in FIG. 17, the first marker may be a solid line and the n-th marker may be a dotted line. Alternatively, the first marker may be characters having a specific meaning, such as "first tote position" and the n-th marker may be characters having a meaning different from that of the first marker, such as "third tote position". Alternatively, the first marker and the n-th marker may be processed with different colors.

Further, the processor 1200 may display a virtual shape of the first tote disposed in the first tote position determined in the step S600' on the screens 220-1 and 220-2 of at least one transport robot 200-1 and 200-2. Further, the processor 1200 may display a virtual shape of the n-th tote disposed in the n-th tote position determined in the step S1100' on the screen 220-2 of the transport robot 200-2.

Figure 18:
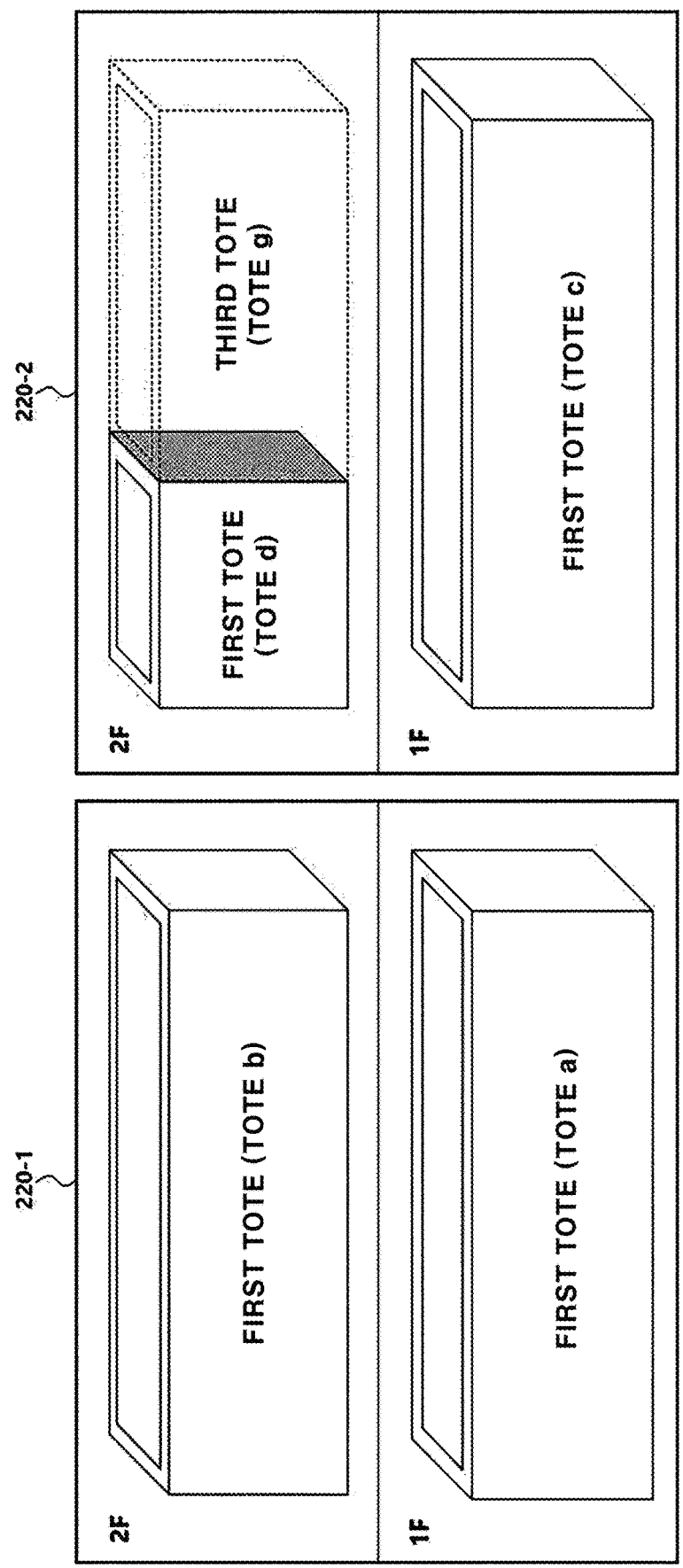
FIG. 18 is a view illustrating that a virtual shape of a first tote is displayed on a screen of a first transport robot and a virtual shape of a first tote and a virtual shape of a third tote are displayed on a screen of a second transport robot.

FIG. 18 is a view illustrating that a virtual shape of the first tote is displayed on a screen 220-1 of a first transport robot 200-1 and a virtual shape of the first tote and a virtual shape of the third tote are displayed on a screen 220-2 of a second transport robot 200-2.

As illustrated in FIG. 18, the processor 1200 may display virtual shapes of first totes (tote a, tote b, tote c, and tote d) which are disposed in the first tote position determined in the step S600' on the screens 220-1 and 220-2 of the first and second transport robots 200-1 and 200-2. Further, the processor 1200 may display a virtual shape of the third tote (tote g) disposed in the third tote position determined in the step S1100' on the screen 220-2 of the second transport robot 200-2.

The processor 1200 may display the virtual shape of the first tote and the virtual shape of the n-th tote with a marker. That is, the processor 1200 may display the virtual shape of the first tote which is disposed in the first tote position determined in the step S600' on the screens 220-1 and 220-2 of the first and second transport robots 200-1 and 200-2 with a first marker and display the virtual shape of the n-th tote which is disposed in the n-th tote position determined in the step S1100' on the screen of the second transport robot 200-2 with an n-th marker. Here, the n-th marker may be different from the first marker.

As illustrated in FIG. 18, the first marker may be a solid line and the n-th marker may be a dotted line. Alternatively, the first marker may be characters having a specific meaning, such as "first tote position" and the n-th marker may be characters having a meaning different from that of the first marker, such as "third tote position". Alternatively, the first marker and the n-th marker may be processed with different colors.

In the meantime, the processor 1200 may select the first tote further using weight information of the first item, among the characteristic information of the first item, in the step S300'. Further, the processor 1200 may select the n-th tote further using weight information of the n-th item, among the characteristic information of the n-th item, in the step S800'.

As described in the first embodiment, in the memory 1100, a lookup table in which weight information of the item and strength of the tote are recorded to be associated with each other may be stored in advance. Accordingly, when the step S300' is performed, the processor 1200 may select a tote having a strength corresponding to the weight information of the first item as a first tote through the lookup table stored in the memory 1100. Further, when the step S800' is performed, the processor 1200 may select a tote having a strength corresponding to the weight information of the n-th item as an n-th tote through the lookup table stored in the memory 1100.

Further, the processor 1200 may select the first tote further using breakage risk information of the first item, among the characteristic information of the first item, in the step S300'. Further, the processor 1200 may select the n-th tote further using breakage risk information of the n-th item, among the characteristic information of the n-th item, in the step S800'.

As described in the first embodiment, in the memory 1100, a lookup table in which breakage risk information of the item and anti-breakage efficiency of the tote are recorded to be associated with each other may be stored in advance. Accordingly, when the step S300' is performed, the processor 1200 may select a tote having an anti-breakage efficiency corresponding to the breakage risk information of the first item as a first tote through the lookup table stored in the memory 1100. Further, when the step S800' is performed, the processor 1200 may select a tote having the anti-breakage efficiency corresponding to the breakage risk information of the n-th item as an n-th tote through the lookup table stored in the memory 1100.

As described above, although the present disclosure has been described by limited embodiments and drawings, the present disclosure is not limited to the embodiments, and it will be apparent to those skilled in the art to which the present disclosure pertains that various modifications and variations may be made from the description. Therefore, the technical idea of the present disclosure needs to be interpreted by the claims and all equivalent modifications are included within the technical idea of the present disclosure.

What is claimed is:

1. An order processing method performed by a processor which executes at least one instruction stored in a memory, comprising:
    (a) a step of receiving a plurality of orders from a warehouse management server;
    (b) a step of identifying characteristic information of a first item which is an item included in a first order, among the plurality of orders;
    (c) a step of selecting a first tote which is a tote accommodating the first item, using at least one of type information, size information, and quantity information of the first item, among the characteristic information of the first item;
    (d) a step of determining a first occupation area which is an area occupying a transport robot when the first tote is disposed on the transport robot, based on occupation area information of each tote to be selected, stored in the memory in advance, and
    (e) a step of determining a first tote position where the first tote is to be disposed on the transport robot based on accommodable area information of the transport robot and the first occupation area which are stored in the memory, in advance.

2. The order processing method according to claim 1, further comprising:
    after the step (e),
    (f) a step of identifying characteristic information of an n-th item which is an item included in an n-th order, among the plurality of orders;
    (g) a step of selecting an n-th tote which is a tote accommodating the n-th item, using at least one of type information, size information, and quantity information of the n-th item, among the characteristic information of the n-th item;
    (h) a step of determining an n-th occupation area which is an area occupying the transport robot when the n-th tote is disposed on the transport robot, based on the occupation area information of each tote to be selected, stored in the memory in advance;
    (i) a step of comparing a currently accommodable area of the transport robot and the n-th occupation area;
    (j) a step of determining an n-th tote position where the n-th tote is to be disposed on the transport robot, only when the n-th tote is accommodable in the currently accommodable area of the transport robot as a comparison result; and
    (k) a step of repeating the steps (f) to (k) until a predetermined tote position determination terminating condition is satisfied by determining whether to satisfy the predetermined tote position determination terminating condition,
    wherein n is a natural number which is applied from 2 in an ascending order, based on the number of times of performing the steps (f) to (k).

3. The order processing method according to claim 2, wherein the processor displays the first tote position and the n-th tote position on a screen of the transport robot, respectively.

4. The order processing method according to claim 3, wherein the processor displays the first tote position on the screen of the transport robot with a first marker and the n-th tote position on the screen of the transport robot with an n-th marker and the n-th marker is different from the first marker.

5. The order processing method according to claim 2, wherein the processor displays a virtual shape of the first tote disposed in the first tote position and a virtual shape of the n-th tote disposed in the n-th tote position on a screen of the transport robot, respectively.

6. The order processing method according to claim 5, wherein the processor differently displays the virtual shape of the first tote and the virtual shape of the n-th tote.

7. The order processing method according to claim 2, wherein the processor selects the first tote further using weight information of the first item, among the characteristic information of the first item in the step (c), selects the n-th tote further using weight information of the n-th item, among the characteristic information of the n-th item in the step (g) and selects a tote having a strength corresponding to the weight information of the first item as the first tote in the step (c), and selects a tote having a strength corresponding to the weight information of the n-th item as the n-th tote in the step (g), through a lookup table in which weight information of an item and a strength of a tote are recorded to be associated with each other.

8. The order processing method according to claim 2 wherein the processor selects the first tote further using breakage risk information of the first item, among the characteristic information of the first item in the step (c), selects the n-th tote further using breakage risk information of the n-th item, among the characteristic information of the n-th item in the step (g), and selects a tote having an anti-breakage efficiency corresponding to the breakage risk information of the first item as the first tote in the step (c), and selects a tote having an anti-breakage efficiency corresponding to the breakage risk information of the n-th item as the n-th tote in the step (g), through a lookup table in which breakage risk information of an item and an anti-breakage efficiency of a tote are recorded to be associated with each other.

9. An order processing method performed by a processor which executes at least one instruction stored in a memory, comprising:
    (a') a step of receiving a plurality of orders from a warehouse management server;
    (b') a step of identifying characteristic information of a first item which is a plurality of items included in a first order, among the plurality of orders;
    (c') a step of selecting a first tote which is a plurality of totes accommodating the first item, using at least one of type information, size information, and quantity information of the first item, among the characteristic information of the first item;

(d') a step of determining a first occupation area which is an area occupying a transport robot when the first tote is disposed on the transport robot, based on occupation area information of each tote to be selected, stored in the memory in advance;

(e') a step of selecting at least one transport robot to which the first tote is to be transported based on accommodable area information of the transport robot and the first occupation area stored in the memory in advance; and (f') a step of determining a first tote position where the first tote is to be disposed on the at least one transport robot.

10. The order processing method according to claim 9, wherein the step (e') includes:

(e1') a step of selecting a first transport robot which is accommodable for a first partial tote, which is a partial tote of the first tote, based on the first occupation area;

(e2') a step of determining whether an area occupied by each tote excluding the first partial tote, among the first tote, exceeds a currently accommodable area of the first transport robot; and (e3') a step of selecting a second transport robot which is accommodable for a second partial tote, which is a partial tote of the first tote, only when an area occupied by each tote excluding the first partial tote among the first tote exceeds all the currently accommodable areas of the first transport robot—the second partial totes are different from the first partial totes.

11. The order processing method according to claim 10, wherein the step (e') further includes:

after the step (e3'), (e4') a step of determining whether an area occupied by each tote excluding the first partial tote to m-1-th partial totes, among the first tote, exceeds a currently accommodable area of an m-1-th transport robot;

(e5') a step of selecting an m-th transport robot which is accommodable for an m-th partial tote, which is a partial tote of the first tote, only when an area occupied by each tote excluding the first partial tote to the m-1-th partial totes among the first tote exceeds all the currently accommodable areas of the m-1-th transport robot—the m-th partial totes are different from the first partial tote to the m-1-th partial totes; and (e6') a step of repeating the steps (e4') to (e6') until a predetermined robot selection terminating condition is satisfied by determining whether to satisfy the predetermined robot selection terminating condition, wherein m is a natural number which is applied from 3 in an ascending order, based on the number of times of performing the steps (e4') to (e6').

12. The order processing method according to claim 9, wherein the processor determines an aisle width between item storage racks in which items are placed in a warehouse, based on warehouse map information which is stored in the memory and item position information in the warehouse received from the warehouse management server and selects the transport robot having a holder width corresponding to the aisle width in the step (e') through a lookup table in which the aisle width and the holder width of the transport robot are recorded to be associated with each other.

13. The order processing method according to claim 9 wherein the processor selects a plurality of transport robots to which the first tote is to be transported in the step (e') and displays the plurality of transport robots selected in the step (e') with the same marker.

14. The order processing method according to claim 9 wherein the processor selects a plurality of transport robots to which the first tote is to be transported in the step (e') and controls the plurality of transport robots to dispose the plurality of transport robots selected in the step (e') adjacent to each other in a gathering point.

15. The order processing method according to claim 9 wherein the processor selects a plurality of transport robots to which the first tote is to be transported in the step (e'), and the method further comprising: after the step (f), (g') a step of identifying characteristic information of an n-th item which is an item included in an n-th order, among the plurality of orders;

(h') a step of selecting an n-th tote which is a tote accommodating the n-th item, using at least one of type information, size information, and quantity information of the n-th item, among the characteristic information of the n-th item;

(i') a step of determining an n-th occupation area which is an area occupying the transport robot when the n-th tote is disposed on the transport robot, based on occupation area information of each tote to be selected, stored in the memory in advance;

(j') a step of comparing a currently accommodable area of any one transport robot, among the plurality of transport robots selected in the step (e') and the n-th occupation area;

(k') a step of determining an n-th tote position where the n-th tote is to be disposed on the any one transport robot, only when the n-th tote is accommodable in the currently accommodable area of the any one transport robot as a comparison result; and (l') a step of repeating the steps (g') to (l') until a predetermined tote position determination terminating condition is satisfied by determining whether to satisfy the predetermined tote position determination terminating condition, wherein n is a natural number which is applied from 2 in an ascending order, based on the number of times of performing the steps (g') to (l').

16. The order processing method according to claim 9, wherein the processor displays the first tote position determined in the step (f') on a screen of the at least one transport robot.

* * * * *